(12) United States Patent
Nakamura et al.

(10) Patent No.: US 7,139,117 B2
(45) Date of Patent: Nov. 21, 2006

(54) OPTICAL TRANSMISSION APPARATUS

(75) Inventors: Eisuke Nakamura, Hokkaido (JP);
Makoto Murakami, Hokkaido (JP);
Kiyotoshi Noheji, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 115 days.

(21) Appl. No.: 10/793,099

(22) Filed: Mar. 5, 2004

(65) Prior Publication Data

US 2004/0190123 A1   Sep. 30, 2004

(30) Foreign Application Priority Data

Mar. 26, 2003 (JP) .............................. 2003-084298

(51) Int. Cl.
*H01S 4/00* (2006.01)
*H04B 10/12* (2006.01)

(52) U.S. Cl. ..................................... 359/334
(58) Field of Classification Search ................. 359/334
See application file for complete search history.

(56) References Cited

U.S. PATENT DOCUMENTS

| | | | | |
|---|---|---|---|---|
| 5,471,334 | A * | 11/1995 | Masuda et al. | 359/337 |
| 6,388,801 | B1 * | 5/2002 | Sugaya et al. | 359/334 |
| 6,433,922 | B1 * | 8/2002 | Ghera et al. | 359/334 |
| 6,462,861 | B1 * | 10/2002 | Ohshima et al. | 359/334 |
| 6,519,082 | B1 * | 2/2003 | Ghera et al. | 359/341.4 |
| 6,577,437 | B1 * | 6/2003 | Sugaya et al. | 359/334 |
| 6,639,716 | B1 * | 10/2003 | Tomofuji | 359/341.41 |
| 6,873,455 | B1 * | 3/2005 | Sugaya et al. | 359/334 |
| 6,934,076 | B1 * | 8/2005 | Goobar et al. | 359/337 |
| 6,975,448 | B1 * | 12/2005 | Park et al. | 359/341.1 |
| 7,061,665 | B1 * | 6/2006 | Sobe et al. | 359/334 |
| 2002/0176154 | A1 * | 11/2002 | Sugaya et al. | 359/334 |
| 2003/0193713 | A1 * | 10/2003 | Sugaya et al. | 359/334 |
| 2004/0036960 | A1 * | 2/2004 | Ramachandran | 359/341.41 |
| 2004/0051938 | A1 * | 3/2004 | Chan et al. | 359/337.1 |
| 2005/0024712 | A1 * | 2/2005 | Hiraizumi et al. | 359/334 |
| 2005/0213196 | A1 * | 9/2005 | Ishikawa et al. | 359/334 |
| 2005/0270634 | A1 * | 12/2005 | Krummrich | 359/334 |
| 2006/0119931 | A1 * | 6/2006 | Ghera et al. | 359/334 |

OTHER PUBLICATIONS

Patent Abstracts of Japan Publication No. 07-193542.

* cited by examiner

*Primary Examiner*—Jack Keith
*Assistant Examiner*—Eric Bolda
(74) *Attorney, Agent, or Firm*—Staas & Halsey LLP

(57) ABSTRACT

An optical transmission apparatus that improves optical transmission quality by performing an optical noise correction and optical level detection with great precision. A first optical amplifier performs optical amplification with an optical fiber transmission line as an amplification medium. A second optical amplifier inputs second excitation light into an amplification medium in which an active substance for optical amplification is doped to perform optical amplification. A first optical level detector monitors, before transmitting an optical signal, a level of optical noise scattered by the first optical amplifier by emitting first excitation light in an operating environment and detects an optical level at the time of transmitting the optical signal by subtracting the level of the optical noise from a signal amplified by the first optical amplifier. A second optical level detector monitors, before transmitting an optical signal, a level of optical noise emitted from the second optical amplifier by emitting the second excitation light in the operating environment and detects an optical level at the time of transmitting the optical signal by subtracting the level of the optical noise from a signal amplified by the second optical amplifier.

1 Claim, 19 Drawing Sheets

OPTICAL TRANSMISSION APPARATUS

BACKGROUND OF THE INVENTION (1) Field of the Invention

This invention relates to an optical transmission apparatus and, more particularly, to an optical transmission apparatus for amplifying and transmitting an optical signal.

(2) Description of the Related Art

Large capacity and high speed are required in optical communication, so expectations for wavelength division multiplexing (WDM) transmission are growing. WDM multiplexes a plurality of optical signals with different wavelengths into a single optical fiber.

Erbium-doped fiber amplifiers (EDFAs) are widely used for optical amplification in WDM systems. EDFAs are optical amplifiers using an erbium-doped fiber (EDF) as an amplification medium. With EDFAs, an EDF through which an optical signal travels is irradiated with excitation light and the level of the optical signal is amplified by stimulated emission caused by the irradiation. A wide-band gain spectrum is obtained by each EDFA, so a plurality of optical signals with wavelengths included in this band can be amplified in block. EDFAs therefore are main devices in WDM repeaters.

Moreover, in recent years optical fiber amplifiers called Raman amplifiers have been put to practical use. With Raman amplifiers, strong excitation light is inputted to the entire optical fiber transmission line to perform optical amplification. To be concrete, the Raman stimulated scattering effect of an optical fiber is utilized and 1.5 μm band optical signals are amplified by the use of 1.4 μm band excitation light. By using Raman amplifiers in repeaters, repeating station spacing can be widened and long-distance large-capacity optical transmission can be realized.

By the way, with optical amplifiers, such as EDFAs or Raman amplifiers, in which optical signals are amplified on the basis of stimulated emission or stimulated scattering, the phenomenon of spontaneous emission or spontaneous scattering will occur regardless of whether there is an input optical signal. Light which leaks out from optical amplifiers as a result of these phenomena becomes noise and is called amplified spontaneous emission (ASE) for amplification by EDFs or amplified spontaneous scattering (ASS) for Raman amplification.

To control optical amplification, the optical level of a main signal itself must be detected with great precision regardless of the amount of such optical noise and optical amplification must be performed on the basis of the result of the detection. Detection of the optical level of a signal including a noise component, that is to say, detection of the sum of the level of a main signal and the level of the noise component will cause a transmission error.

It is assumed that the level of a main signal itself is low and that the level of a noise component is high. If the level of an optical signal to be transmitted is considered to satisfy a desired value and this optical signal is transmitted to a downstream station, then problems will arise. For example, the level of the main signal the downstream station can receive cannot be ensured. As a result, a transmission error occurs or repeating station spacing cannot be widened.

Conventionally, to control optical amplification, the technique of comparing the intensity level of ASE noise light which is emitted from a rare-earth doped fiber, such as an EDF, with an intensity level at which predetermined amplification factor dependence is obtained and of controlling the amount of excitation light so that the two intensity levels will match has been proposed (see, for example, Japanese Unexamined Patent Publication No. 7-193542, paragraph nos. [0032]-[0033] and FIG. 11).

With the above conventional technique, however, only EDFs are considered as optical amplification media. Therefore, it does not apply to Raman amplifiers. Conventionally, on the other hand, to perform an optical noise correction, the amount of optical noise is measured in advance in a test environment and a correction is performed in an operating environment on the basis of the level of the optical noise measured.

That is to say, first, a predetermined excitation light is inputted to an optical amplification medium in a test environment and the level of optical noise produced is measured. In an operating environment, the level of a main signal itself is detected by subtracting the value of the optical noise level measured in advance from the level of an optical signal amplified by an optical amplifier (from the level of an optical signal obtained by amplifying an input optical signal by inputting the predetermined excitation light used in the test environment to the optical amplification medium).

With such conventional optical noise correction, however, the difference between a test environment in which data regarding optical noise is acquired and a customer's operating environment will cause an error in the amount of noise. Accordingly, optical noise cannot be corrected accurately and the level of a main signal itself cannot be detected accurately.

An optical fiber transmission line itself is used as an amplification medium especially in Raman amplifiers. Therefore, an error will occur between ASS measured in a test environment and ASS which occurs in an operating environment because of a difference in the WDL of a fiber (the wavelength characteristic of a fiber loss), a lamp loss (a loss which will occur around a portion of a transmission line in a Raman amplifier where excitation light is inputted), or the like. In addition to an error which will occur in a sample optical amplifier at the time of data acquisition, errors may be caused by, for example, variations (part variations) among optical amplifiers manufactured and shipped.

It is assumed that a correction amount is larger than the actual amount of noise (that a value greater than the actual level of optical noise is subtracted from the level of an optical signal amplified). Even if the optical signal sent from an upstream station is at a level a downstream station can receive, the level of a main signal will be estimated at a small value at the downstream station. This may lead to the judgment that the optical signal cannot be transmitted from the downstream station. (In an extreme case, the judgment that there is no main signal (that the circumstances are in an alarm state) is made and output from an optical amplifier is stopped.) By contrast, it is assumed that a correction amount is smaller than the actual amount of noise (that a value smaller than the actual level of optical noise is subtracted from the level of an optical signal amplified). Even if the optical signal sent from an upstream station is at a level a downstream station cannot receive, the level of a main signal will be estimated at a great value at the downstream station. This may lead to the judgment that the optical signal can be transmitted from the downstream station. (In an extreme case, though there is no transmitted main signal due to a failure, such as disconnection of a fiber, the optical noise may be considered as a main signal and be transmitted from the downstream station.) These two defects will appear significantly in the case of the number of wavelengths being small. As a result, the limitation of the minimum operating wavelength number is imposed.

SUMMARY OF THE INVENTION

The present invention was made under the background circumstances described above. An object of the present invention is to provide an optical transmission apparatus for improving optical transmission quality by accurately performing an optical noise correction and by detecting an optical level with great precision.

In order to achieve the above object, an optical transmission apparatus for amplifying and transmitting an optical signal is provided. This optical transmission apparatus comprises a first optical amplifier for inputting first excitation light into an optical fiber transmission line to perform optical amplification with the optical fiber transmission line as an amplification medium, a second optical amplifier for inputting second excitation light into an amplification medium in which an active substance for optical amplification is doped to perform optical amplification, a first optical level detector for monitoring, before transmitting an optical signal, a level of optical noise scattered by the first optical amplifier by emitting the first excitation light and for detecting an optical level at the time of transmitting the optical signal by subtracting the level of the optical noise monitored from a signal amplified by the first optical amplifier, and a second optical level detector for monitoring, before transmitting an optical signal, a level of optical noise emitted from the second optical amplifier by emitting the second excitation light and for detecting an optical level at the time of transmitting the optical signal by subtracting the level of the optical noise monitored from a signal amplified by the second optical amplifier.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
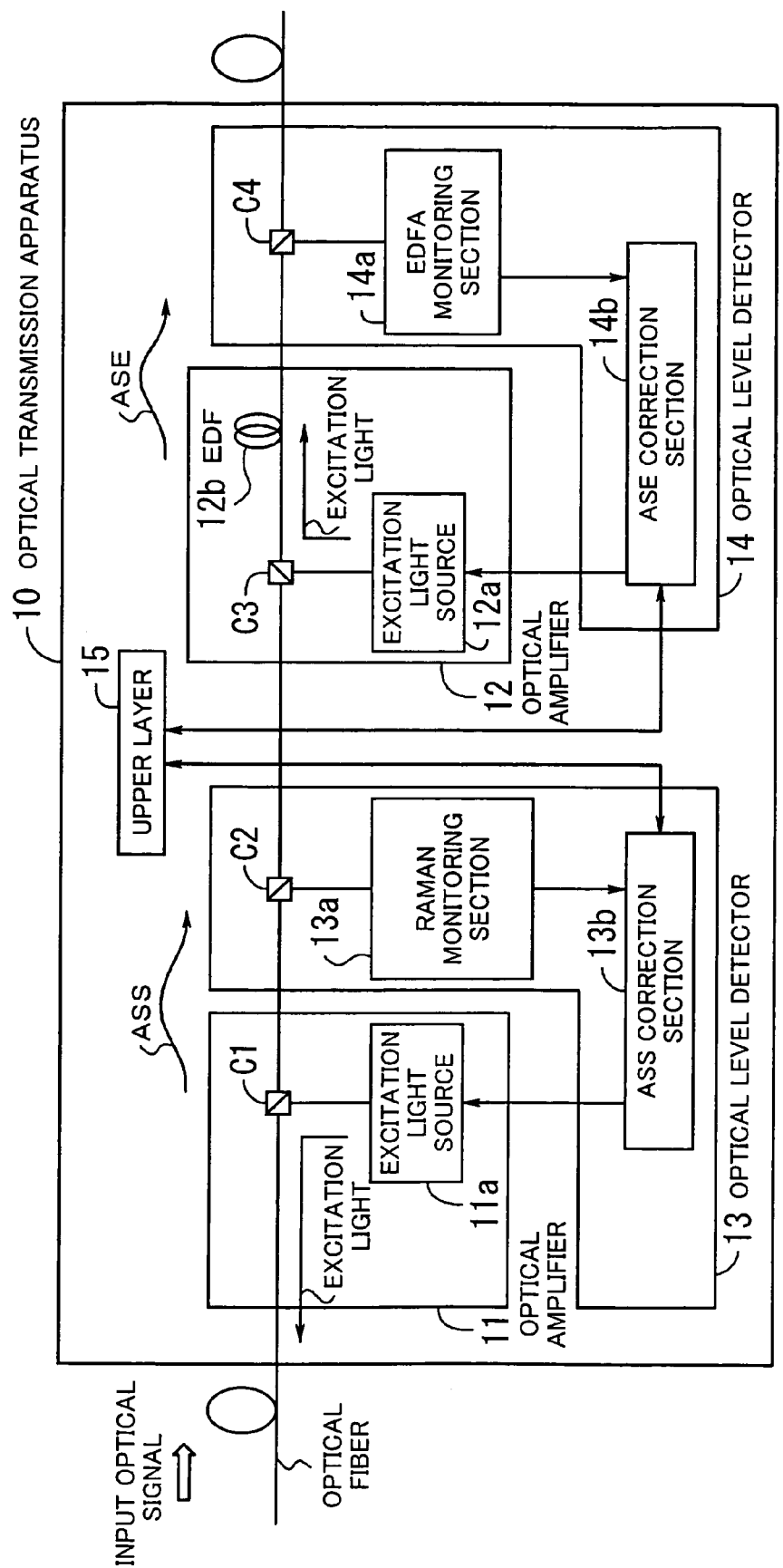
FIG. 1 is a view for describing the principles underlying an optical transmission apparatus according to the present invention.

Embodiments of the present invention will now be described with reference to the drawings. FIG. 1 is a view for describing the principles underlying an optical transmission apparatus according to the present invention. An optical transmission apparatus 10 comprises a first optical amplifier (optical amplifier 11), a second optical amplifier (optical amplifier 12), a first optical level detector (optical level detector 13), a second optical level detector (optical level detector 14), and an upper layer 15.

The optical amplifier 11 includes an excitation light source 11a and a coupler C1. The optical amplifier 12 includes an excitation light source 12a, an EDF 12b, and a coupler C3. The optical level detector 13 includes a Raman monitoring section 13a, an ASS correction section 13b, and a coupler C2. The optical level detector 14 includes an EDFA monitoring section 14a, an ASE correction section 14b, and a coupler C4.

The optical amplifier 11 inputs excitation light from the excitation light source 11a to an optical fiber transmission line via the coupler 1 to perform Raman amplification. Before transmission of an optical signal (before operation), in an operating environment the optical level detector 13 makes the excitation light source 11a emit Raman excitation light and monitors the level of optical noise (ASS) scattered by the optical amplifier 11. Then the optical level detector 13 detects an optical level by subtracting the ASS level from a signal amplified by the optical amplifier 11 at the time of transmitting an optical signal (at operation time).

The optical amplifier 12 inputs excitation light from the excitation light source 12a to the EDF 12b via the coupler C3 to perform optical amplification (hereinafter also called EDF amplification). Before transmission of an optical signal, in an operating environment the optical level detector 14 makes the excitation light source 12a emit excitation light (hereinafter also called EDF excitation light) and monitors the level of optical noise (ASE) emitted from the optical amplifier 12. Then the optical level detector 14 detects an optical level by subtracting the ASE level from a signal amplified by the optical amplifier 12 at the time of transmitting an optical signal. The operation of detecting an optical level, including removing optical noise, will be described later in detail.

Figure 2:
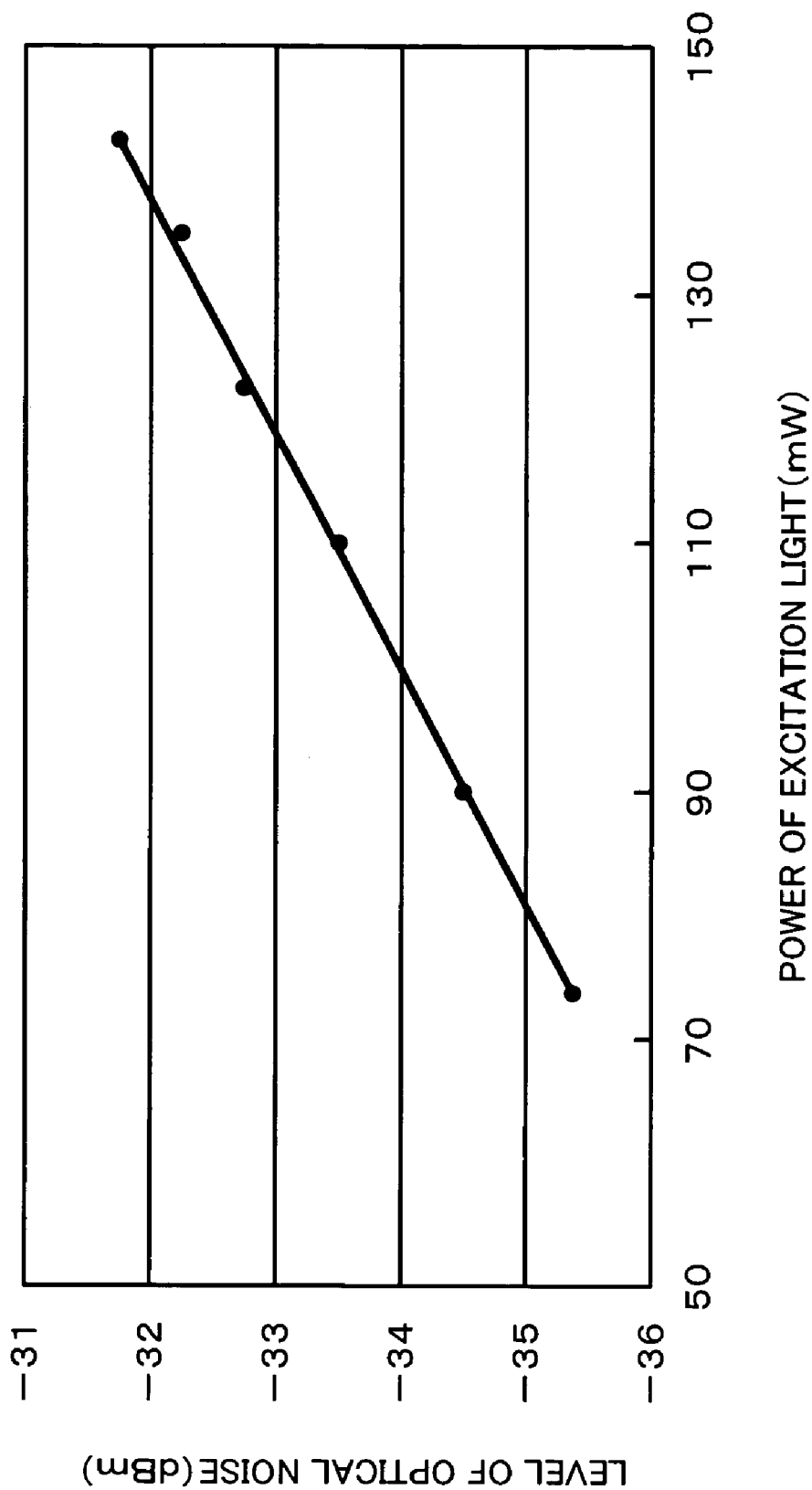
FIG. 2 shows the relation between optical noise and the power of excitation light.

FIG. 2 shows the relation between optical noise and the power of excitation light. A horizontal axis and a vertical axis in FIG. 2 indicate the power (mW) of excitation light and the level (dBm) of optical noise respectively. Even if an optical signal to be amplified is not inputted to an optical amplifier, excitation light is inputted and the phenomenon of spontaneous scattering or spontaneous emission will occur. Accordingly, ASS or ASE will also occur.

FIG. 2 indicates that the level of optical noise is determined uniquely by the value of the power of excitation light (that is to say, the level of optical noise depends on the level of excitation light). Therefore, if the power of excitation light is constant, then the level of optical noise before optical amplification will be equal to that of optical noise after the optical amplification. In the present invention, in an operating environment, predetermined excitation light to be used at operation time is inputted to an amplification medium and the level of optical noise produced is measured in advance. At operation time, an optical noise correction and optical level detection are performed by the use of the correction value measured in advance.

Figure 3:
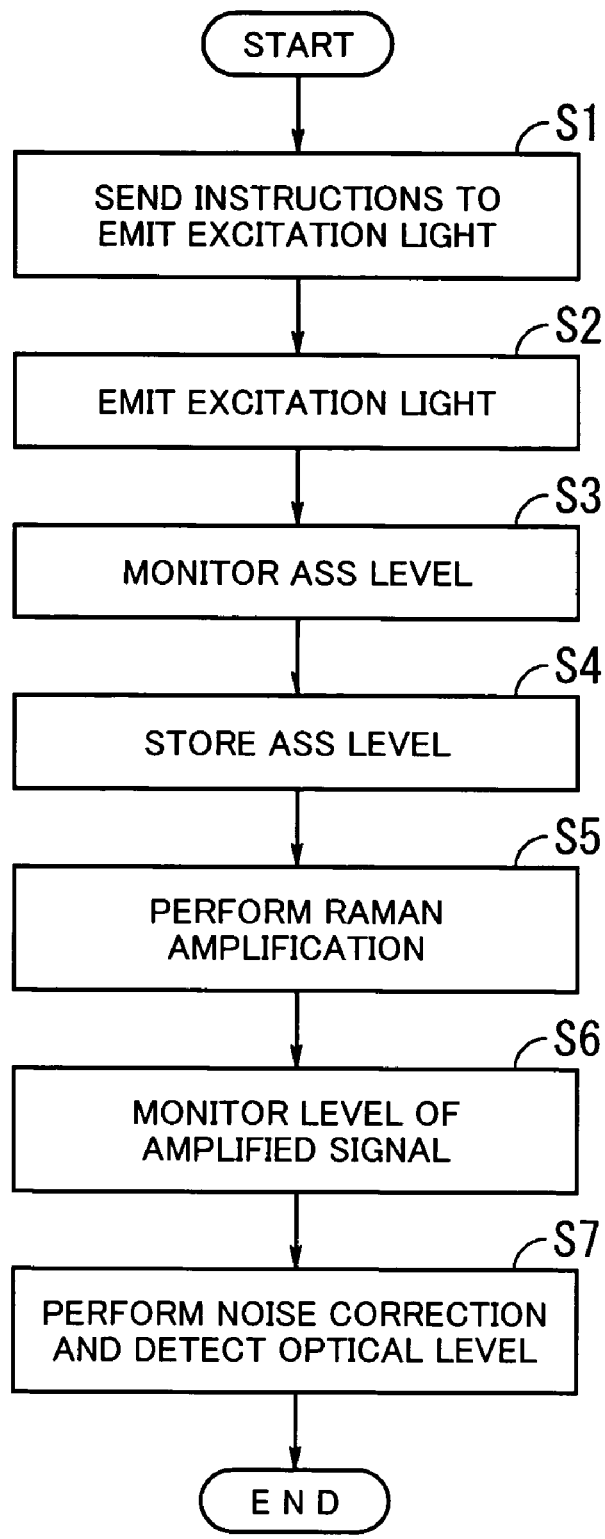
FIG. 3 is a flow chart showing the operation of detecting an optical level performed on the Raman amplification side.

Operation will now be described in detail with flow charts. The operation of detecting an optical level performed on the Raman amplification side will be described first. FIG. 3 is a flow chart showing the operation of detecting an optical level performed on the Raman amplification side. In this case, it is assumed that the level of an input optical signal is constant and that amplification is performed by the use of excitation light with constant power (for example, with WDM input optical signals, it is assumed that the number of wavelengths multiplexed is constant). Steps S1 through S4 are performed for measuring the level of optical noise in an operating environment before optical transmission. Steps S5 through S7 are performed during optical transmission.

[S1] In the optical transmission apparatus 10 located in an operating environment, before optical transmission the upper layer 15 sends the ASS correction section 13b instructions to emit excitation light.

[S2] When the ASS correction section 13b receives the instructions to emit excitation light, the ASS correction section 13b drives the excitation light source 11a and makes it emit excitation light with a wavelength and power to be used at optical transmission time.

[S3] The Raman monitoring section 13a receives ASS which leaks out from the optical amplifier 11 via the coupler C2, monitors the level of the ASS, and informs the ASS correction section 13b of a monitored value $L_{ASS}$.

[S4] The ASS correction section 13b stores the monitored value $L_{ASS}$.

[S5] The optical amplifier 11 performs Raman amplification of an optical signal at optical transmission time.

[S6] The Raman monitoring section 13a receives an optical signal obtained by Raman amplification via the coupler C2, monitors the optical level of the optical signal, and informs the ASS correction section 13b of a monitored value L1.

[S7] The ASS correction section 13b detects the optical level of an optical signal obtained as a result of removing an ASS noise component by subtracting the value $L_{ASS}$, which is the level of the ASS and which was stored in step S3, from the monitored value L1 obtained in step S6 (by performing an optical noise correction) and informs the upper layer 15 of it. Such control enables the upper layer 15 to recognize the optical level of an optical signal obtained by performing Raman amplification of an optical signal relayed and removing an ASS noise component.

If an optical level (optical level L1c) obtained by subtracting $L_{ASS}$, being the level of the ASS, is equal to a predetermined main signal level (main signal level L1m) after Raman amplification recognized in advance, then the upper layer 15 can consider that the Raman amplification and optical relay transmission were performed normally. If the optical level L1c is higher than the main signal level L1m, then the upper layer 15 can decide that some automatic level control (ALC) error has occurred before the optical transmission apparatus 10.

If the optical level L1c is lower than the main signal level L1m, then the upper layer 15 decides, for example, that the power of the excitation light source 11a has dropped due to deterioration with the passage of time or that only a noise component may be transmitted due to a failure, such as disconnection of a fiber, before the optical transmission apparatus 10, and takes action, such as auto power shut down (APSD), to cope with the above failure.

Figure 4:
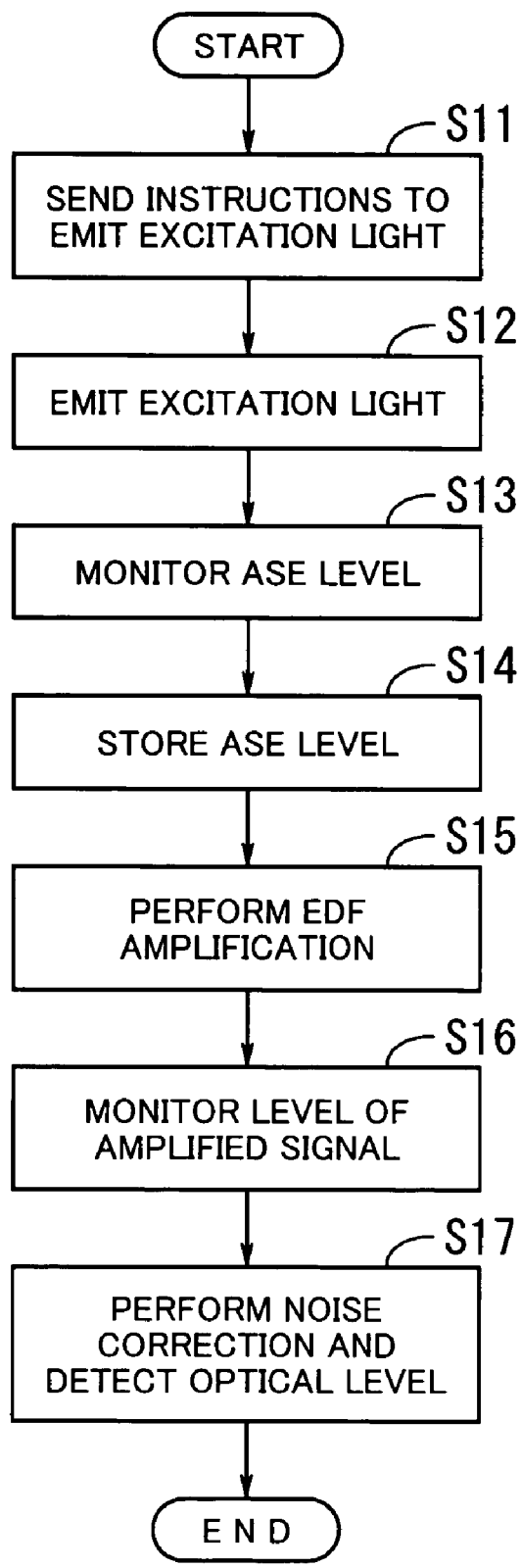
FIG. 4 is a flow chart showing the operation of detecting an optical level performed on the EDFA side.

Next, the operation of detecting an optical level performed on the EDFA side will be described. FIG. 4 is a flow chart showing the operation of detecting an optical level performed on the EDFA side. In this case, it is assumed that the level of an input optical signal is constant and that amplification is performed by the use of excitation light with constant power. Steps S11 through S14 are performed for measuring the level of optical noise in an operating environment before optical transmission. Steps S15 through S17 are performed during optical transmission.

[S11] In the optical transmission apparatus 10 located in an operating environment, before optical transmission the upper layer 15 sends the ASE correction section 14b instructions to emit excitation light.

[S12] When the ASE correction section 14b receives the instructions to emit excitation light, the ASE correction section 14b drives the excitation light source 12a and makes it emit excitation light with a wavelength and power to be used at optical transmission time.

[S13] The EDFA monitoring section 14a receives ASE which leaks out from the optical amplifier 12 via the coupler C4, monitors the level of the ASE, and informs the ASE correction section 14b of a monitored value $L_{ASE}$.

[S14] The ASE correction section 14b stores the monitored value $L_{ASE}$.

[S15] The optical amplifier 12 performs EDF amplification of an optical signal at optical transmission time.

[S16] The EDFA monitoring section 14a receives an optical signal obtained by EDF amplification via the coupler C4, monitors the optical level of the optical signal, and informs the ASE correction section 14b of a monitored value L2.

[S17] The ASE correction section 14b detects the optical level of an optical signal obtained as a result of removing an ASE noise component by subtracting the value $L_{ASE}$, which is the level of the ASE and which was stored in step S13, from the monitored value L2 obtained in step S16 (by performing an optical noise correction) and informs the upper layer 15 of it. Such control enables the upper layer 15 to recognize the optical level of an optical signal obtained by performing EDF amplification and removing an ASE noise component.

If an optical level (optical level L2c) obtained by subtracting $L_{ASE}$, being the level of the ASE, is equal to a predetermined main signal level (main signal level L2m) after EDF amplification recognized in advance, then the upper layer 15 can consider that the EDF amplification was performed normally. If the optical level L2c is higher than the main signal level L2m, then the upper layer 15 can decide that an ALC error has occurred in the optical amplifier 12. If the optical level L2c is lower than the main signal level L2m, then the upper layer 15 can decide, for example, that the power of the excitation light source 12a has dropped due to deterioration with the passage of time.

Conventionally, the level of optical noise has been measured in a test environment to acquire data. As described above, however, in the present invention the level of optical noise is measured in an actual operating environment to perform an optical noise correction. As a result, an error between optical noise correction values due to a difference in environment (WDL, lamp loss, etc.) will not occur. This enables an accurate optical noise correction and precision optical level detection.

Figure 5:
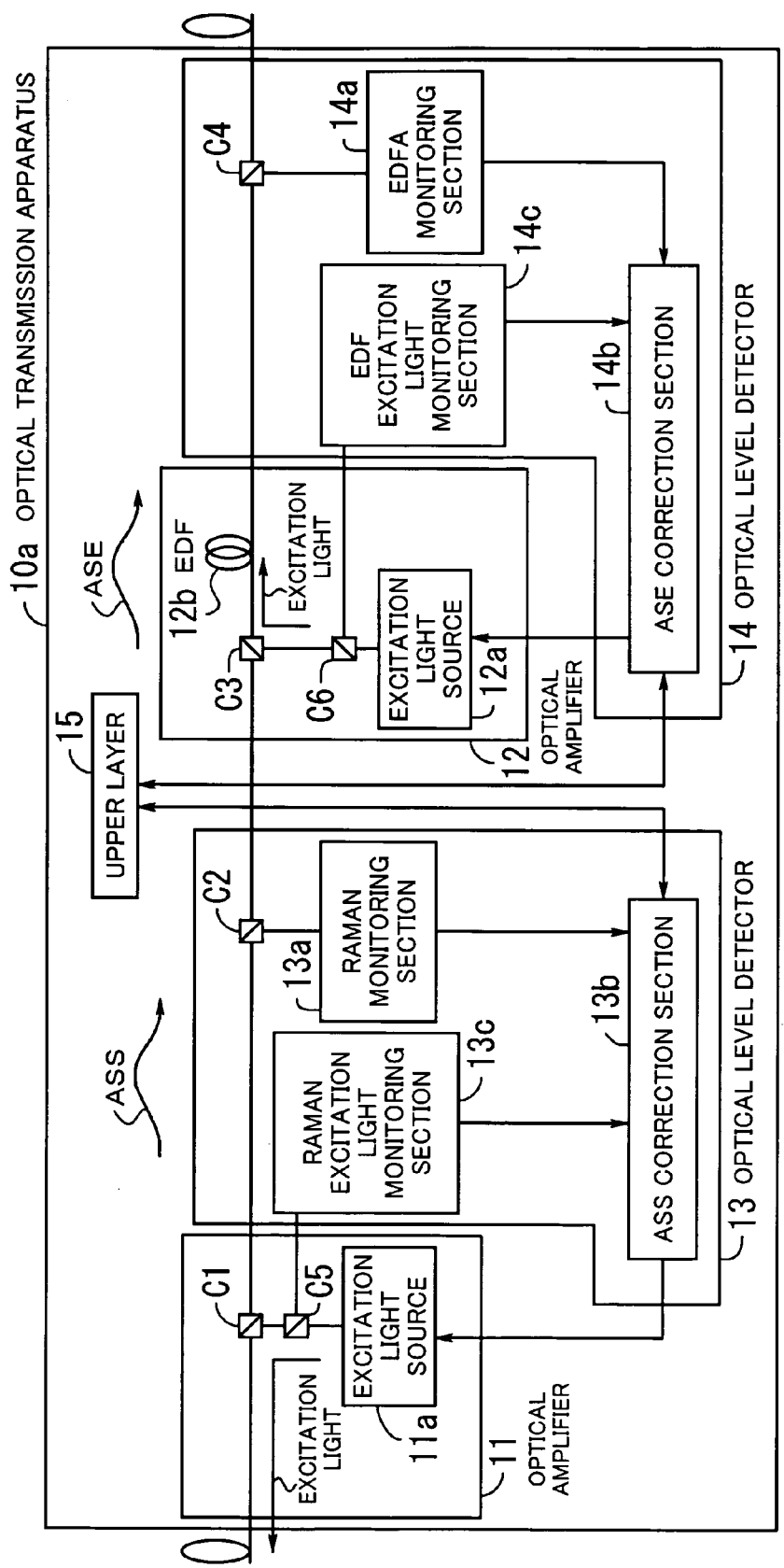
FIG. 5 shows the structure of an optical transmission apparatus.

An optical transmission apparatus according to the present invention in which the power of excitation light is variable will now be described. FIG. 5 shows the structure of an optical transmission apparatus. In the optical transmission apparatus 10 shown in FIG. 1, the power of excitation light is constant. In an optical transmission apparatus 10a, however, the power of excitation light is varied to measure optical noise corresponding to a plurality of excitation light power values.

If there are variations in the level of an input optical signal, excitation light with power corresponding to the variations must be emitted (for example, if the number of wavelengths with which WDM optical signals inputted are multiplexed is changed, optical amplification will be performed by the use of excitation light with power corresponding to the number of wavelengths). The optical transmission apparatus 10a will be used in an operating environment where input optical signals vary in this way.

The optical transmission apparatus 10a differs from the optical transmission apparatus 10 shown in FIG. 1 in that an optical amplifier 11, an optical level detector 13, an optical amplifier 12, and an optical level detector 14 include a coupler C5, a Raman excitation light monitoring section 13c, a coupler C6, and an EDF excitation light monitoring section 14c respectively. The other components in the optical transmission apparatus 10a are the same as those in the optical transmission apparatus 10 shown in FIG. 1.

Figure 6:
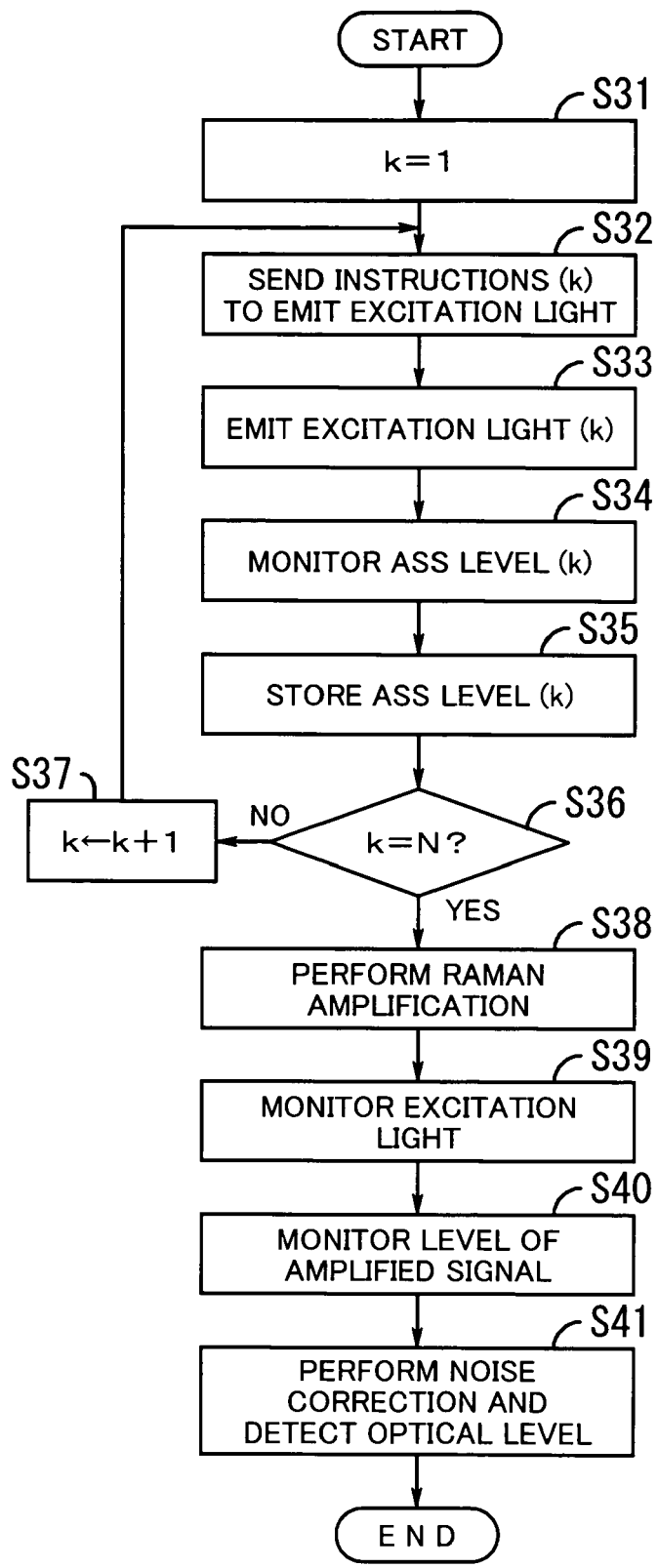
FIG. 6 is a flow chart showing the operation of detecting an optical level performed on the Raman amplification side.

Operation will now be described. The operation of detecting an optical level performed on the Raman amplification side will be described first. FIG. 6 is a flow chart showing the operation of detecting an optical level performed on the Raman amplification side. It is assumed that the level of optical noise is measured N times (that is to say, it is assumed that the power of excitation light is set to one of N values). Steps S31 through S37 are performed for measuring the level of optical noise in an operating environment before optical transmission. Steps S38 through S41 are performed during optical transmission.

[S31] k is set to 1. ($1 \leq k \leq N$)

[S32] In the optical transmission apparatus 10a located in an operating environment, before optical transmission an upper layer 15 sends an ASS correction section 13b instructions (k) to emit excitation light.

[S33] When the ASS correction section 13b receives the instructions (k) to emit excitation light, the ASS correction section 13b drives an excitation light source 11a and makes it emit excitation light (k) with a wavelength and power to be used at optical transmission time.

[S34] A Raman monitoring section 13a receives ASS (k) which leaks out from the optical amplifier 11 via a coupler C2, monitors the level (k) of the ASS, and informs the ASS correction section 13b of a monitored value LASS (k).

[S35] The ASS correction section 13b stores the monitored value $L_{ASS}$ (k).

[S36] The upper layer 15 checks whether k=N. If k=N, then the upper layer 15 decides that excitation light power is being varied, and step S37 will be performed. If k=N, then the upper layer 15 decides that the varying of excitation light power is complete, and step S38 will be performed.

[S37] k is incremented by one and the process will return to step S32.

[S38] The optical amplifier 11 performs Raman amplification of an optical signal at optical transmission time.

[S39] The Raman excitation light monitoring section 13c monitors the power of currently used excitation light via the coupler C5 and informs the ASS correction section 13b of a monitoring result.

[S40] The Raman monitoring section 13a receives an optical signal obtained by Raman amplification via the coupler C2, monitors the optical level of the optical signal, and informs the ASS correction section 13b of a monitored value L3.

[S41] The ASS correction section 13b recognizes an appropriate ASS level it has stored from the monitored value of the power of excitation light obtained in step S39, detects the optical level of an optical signal obtained as a result of removing an ASS noise component by subtracting the appropriate ASS level from the monitored value L3 obtained in step S40, and informs the upper layer 15 of it.

Figure 7:
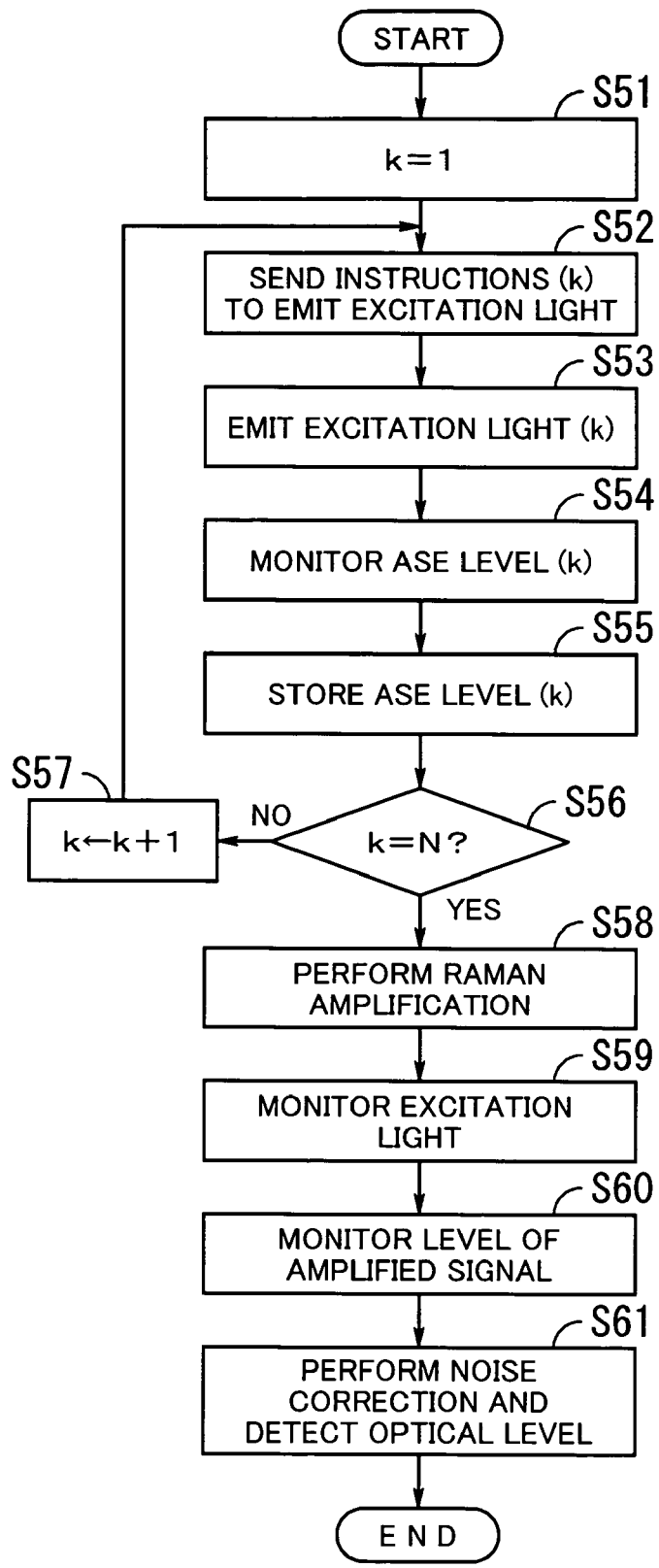
FIG. 7 is a flow chart showing the operation of detecting an optical level performed on the EDF amplification side.

FIG. 7 is a flow chart showing the operation of detecting an optical level performed on the EDF amplification side. Steps S51 through S57 are performed for measuring the level of optical noise in an operating environment before optical transmission. Steps S58 through S61 are performed during optical transmission.

[S51] k is set to 1. ($1 \leq k \leq N$)

[S52] In the optical transmission apparatus 10a located in an operating environment, before optical transmission an upper layer 15 sends an ASE correction section 14b instructions (k) to emit excitation light.

[S53] When the ASE correction section 14b receives the instructions (k) to emit excitation light, the ASE correction section 14b drives an excitation light source 12a and makes it emit excitation light (k) with a wavelength and power to be used at optical transmission time.

[S54] An EDFA monitoring section 14a receives ASE (k) which leaks out from the optical amplifier 12 via a coupler C4, monitors the level (k) of the ASE, and informs the ASE correction section 14b of a monitored value $L_{ASE}$ (k).

[S55] The ASE correction section 14b stores the monitored value $L_{ASE}$ (k).

[S56] The upper layer 15 checks whether k=N. If k=N, then the upper layer 15 decides that a sweep is being performed, and step S57 will be performed. If k=N, then the upper layer 15 decides that a sweep is complete, and step S58 will be performed.

[S57] k is incremented by one and the process will return to step S52.

[S58] The optical amplifier 12 performs EDF amplification of an optical signal at optical transmission time.

[S59] The EDF excitation light monitoring section 14c monitors the power of currently used excitation light via the coupler C6 and informs the ASE correction section 14b of a monitoring result.

[S60] The EDFA monitoring section 14a receives an optical signal obtained by Raman amplification via the coupler C4, monitors the optical level of the optical signal, and informs the ASE correction section 14b of a monitored value L4.

[S61] The ASE correction section 14b recognizes an appropriate ASE level it has stored from the monitored value of the power of excitation light obtained in step S59, detects the optical level of an optical signal obtained as a result of removing an ASE noise component by subtracting the appropriate ASE level from the monitored value L4 obtained in step S60, and informs the upper layer 15 of it.

Figure 8:
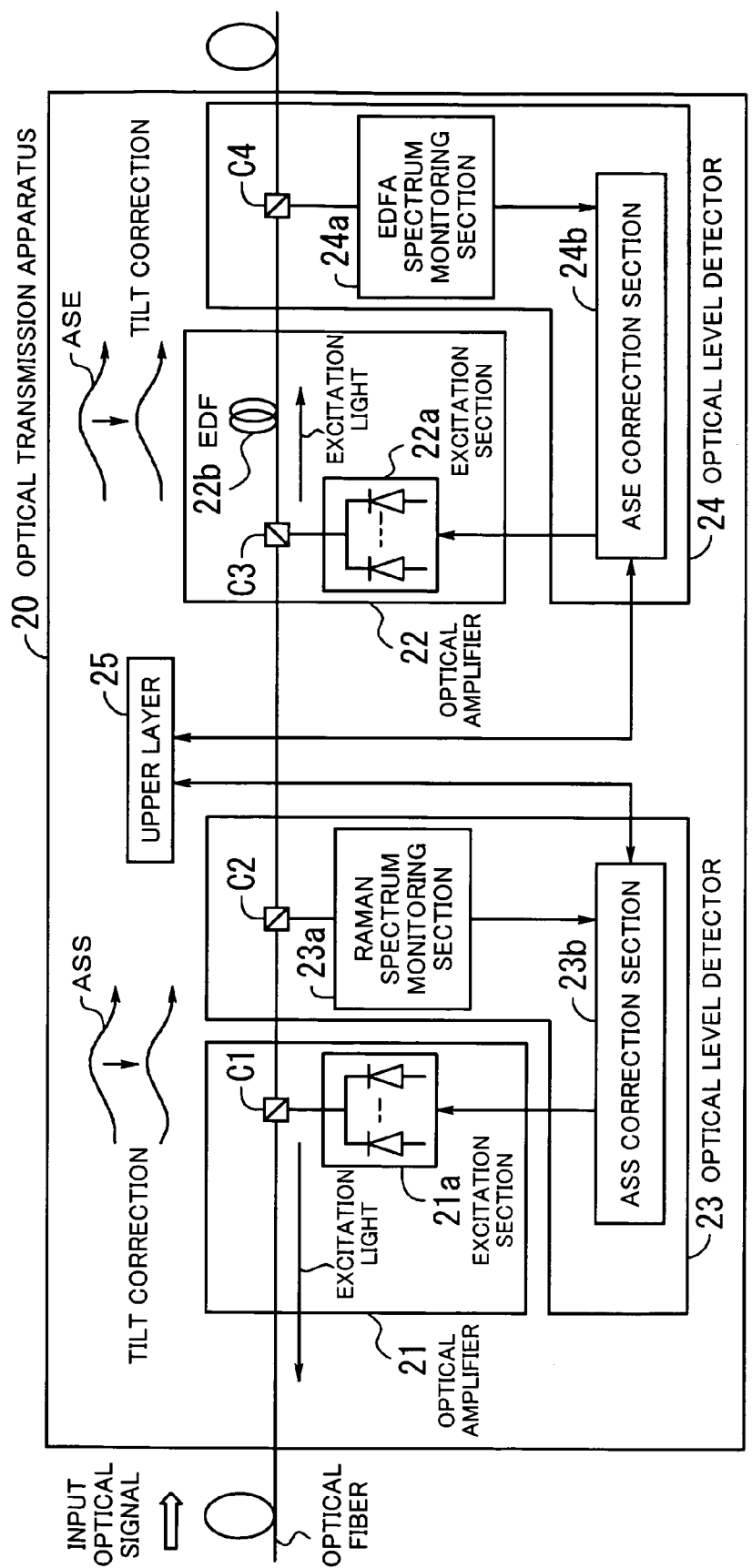
FIG. 8 shows the structure of an optical transmission apparatus.

An optical transmission apparatus according to the present invention in which a difference in optical noise level according to wavelengths (tilt) is corrected will now be described. FIG. 8 shows the structure of an optical transmission apparatus. An optical transmission apparatus 20 comprises optical amplifiers 21 and 22, optical level detectors 23 and 24, and an upper layer 25.

The optical amplifier 21 includes an excitation section 21a and a coupler C1. The optical amplifier 22 includes an excitation section 22a, an EDF 22b, and a coupler C3. The optical level detector 23 includes a Raman spectrum monitoring section 23a, an ASS correction section 23b, and a coupler C2. The optical level detector 24 includes an EDFA spectrum monitoring section 24a, an ASE correction section 24b, and a coupler C4.

The optical amplifier 21 inputs excitation light from the excitation section 21a to an optical fiber transmission line via the coupler C1 to perform Raman amplification. The excitation section 21a includes a plurality of excitation light sources for emitting excitation light with different wavelengths $\lambda 1$ through $\lambda n$.

Before transmission of an optical signal, in an operating environment the optical level detector 23 makes the excitation section 21a emit Raman excitation light, monitors a profile of ASS (an ASS level corresponding to each of the excitation wavelengths $\lambda 1$ through $\lambda n$) scattered by the optical amplifier 21, and recognizes the tilt of optical noise from monitoring results. Then the optical level detector 23 controls the power of the excitation light at the time of transmitting the optical signal to prevent the tilt from occurring. Moreover, the optical level detector 23 detects an optical level by subtracting an ASS level from a signal amplified by the optical amplifier 21.

The optical amplifier 22 inputs excitation light from the excitation section 22a to the EDF 22b via the coupler C3 to perform EDF amplification. The excitation section 22a includes a plurality of excitation light sources for emitting excitation light with the different wavelengths $\lambda 1$ through $\lambda n$.

Before transmission of an optical signal, in an operating environment the optical level detector 24 makes the excitation section 22a emit EDF excitation light, monitors a profile of ASE (an ASE level corresponding to each of the excitation wavelengths $\lambda 1$ through $\lambda n$) emitted from the optical amplifier 22, and recognizes the tilt of optical noise from monitoring results. Then the optical level detector 24 controls the power of the excitation light at the time of transmitting the optical signal to prevent the tilt from occurring. Moreover, the optical level detector 24 detects an optical level by subtracting an ASE level from a signal amplified by the optical amplifier 22.

Figure 9:
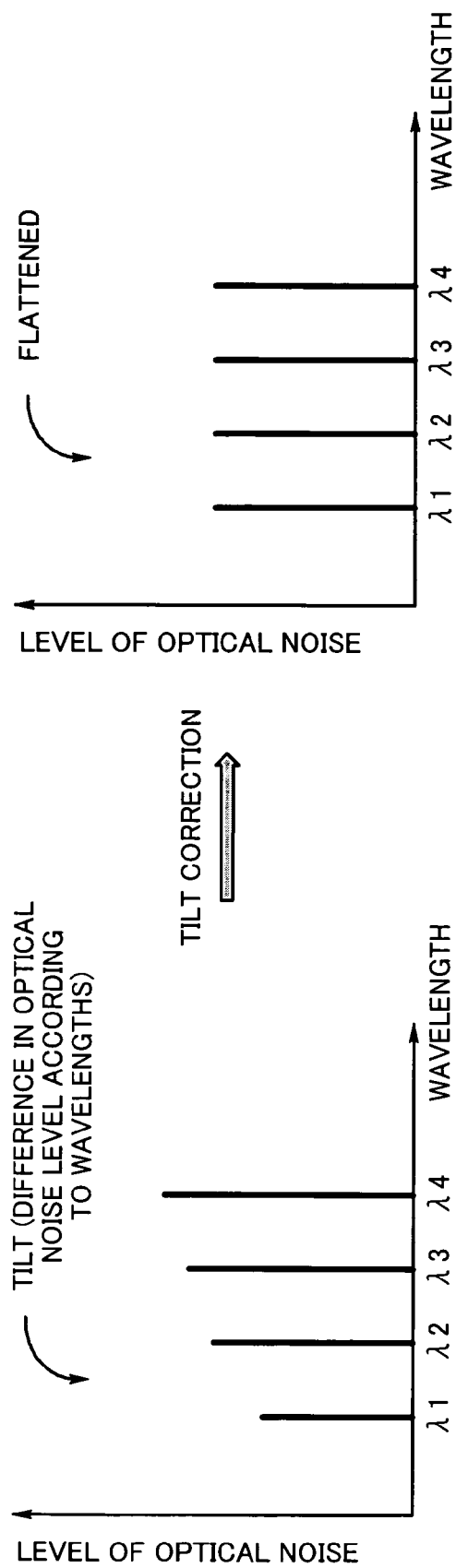
FIG. 9 shows a schematic of a tilt correction.

FIG. 9 shows a schematic of a tilt correction. A horizontal axis and a vertical axis in FIG. 9 indicate the wavelength of excitation light and the level of optical noise respectively. When excitation light with the same power and the different wavelengths $\lambda 1$ through $\lambda n$ is inputted to an optical amplifier, the levels of optical noise which leaks out from it will differ among the different wavelengths. Accordingly, there will appear a tilt in a wavelength band used. In the present invention, the power of excitation light with each wavelength is controlled so that the levels of optical noise will be constant regardless of excitation wavelengths. By doing so, the tilt will be corrected and the levels of optical noise in the wavelength band used will be flattened.

Figure 10:
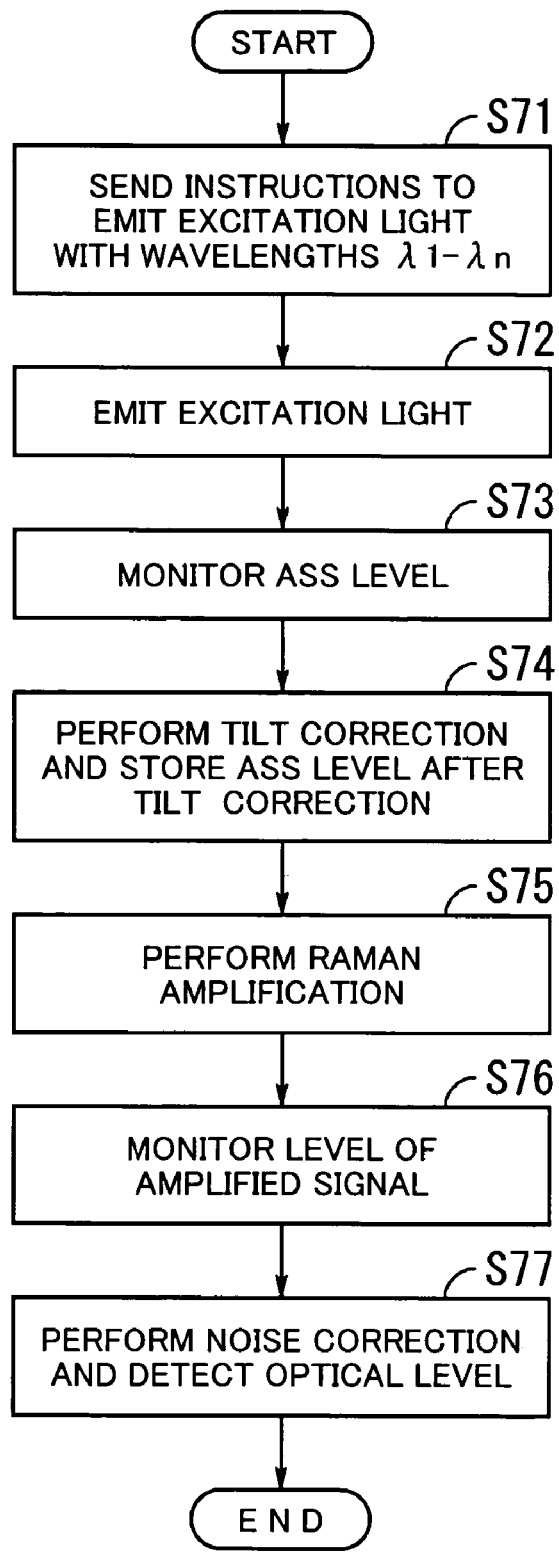
FIG. 10 is a flow chart showing the operation of detecting an optical level performed on the Raman amplification side.

Operation will now be described in detail with flowcharts FIG. 10 is a flow chart showing the operation of detecting an optical level performed on the Raman amplification side. Steps S71 through S74 are performed for measuring the level of optical noise in an operating environment before optical transmission. Steps S75 through S77 are performed during optical transmission.

[S71] In the optical transmission apparatus 20 located in an operating environment, before optical transmission the upper layer 25 sends the ASS correction section 23b instructions to emit excitation light.

[S72] When the ASS correction section 23b receives the instructions to emit excitation light, the ASS correction section 23b drives the excitation section 21a and makes it emit excitation light with the same power and the different wavelengths $\lambda 1$ through $\lambda n$.

[S73] The Raman spectrum monitoring section 23a receives ASS which leaks out from the optical amplifier 21 via the coupler C2, monitors the level of ASS corresponding to each of $\lambda 1$ through $80$ n, and informs the ASS correction section 23b of monitoring results.

[S74] The ASS correction section 23b controls the power of excitation light with each of the wavelengths $\lambda 1$ through $\lambda n$ emitted from the excitation section 21a on the basis of the monitoring results and performs a tilt correction regarding the ASS as shown in FIG. 9. Furthermore, the ASS correction section 23b stores the level value of ASS after the tilt correction (the number of these level values is one because the levels of optical noise corresponding to the wavelengths $\lambda 1$ through $\lambda n$ have become equal to one another).

[S75] The optical amplifier 21 performs Raman amplification of an optical signal at optical transmission time.

[S76] The Raman spectrum monitoring section 23a receives an optical signal obtained by Raman amplification via the coupler C2, monitors the optical level of the optical signal, and informs the ASS correction section 23b of a monitored value.

[S77] The ASS correction section 23b detects the optical level of an optical signal obtained as a result of removing an ASS noise component by subtracting the ASS level value stored in step S74 from the monitored value obtained in step S76 and informs the upper layer 25 of it. Such control enables the upper layer 25 to recognize with great precision the optical level of an optical signal obtained by performing Raman amplification of an optical signal relayed and removing an ASS noise component.

Figure 11:
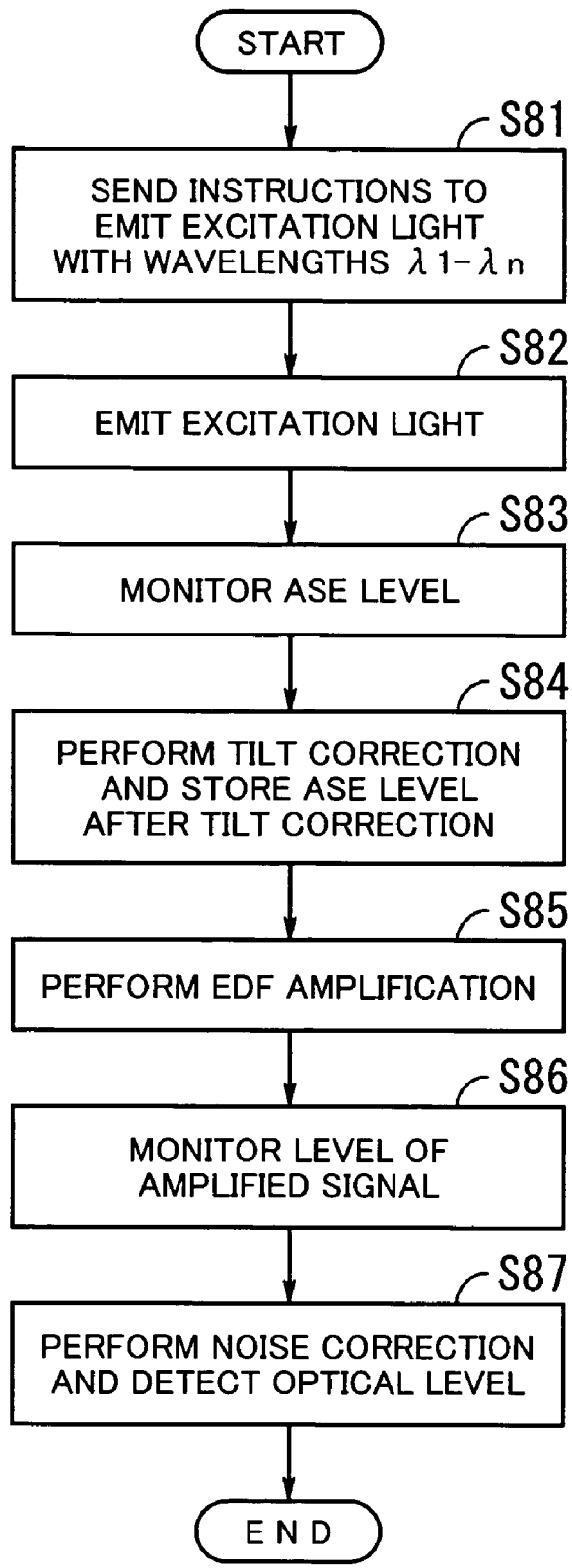
FIG. 11 is a flow chart showing the operation of detecting an optical level performed on the EDF amplification side.

FIG. 11 is a flow chart showing the operation of detecting an optical level performed on the EDF amplification side. Steps S81 through S84 are performed for measuring the level of optical noise in an operating environment before optical transmission. Steps S85 through S87 are performed during optical transmission.

[S81] In the optical transmission apparatus 20 located in an operating environment, before optical transmission the upper layer 25 sends the ASE correction section 24b instructions to emit excitation light.

[S82] When the ASE correction section 24b receives the instructions to emit excitation light, the ASE correction section 24b drives the excitation section 22a and makes it emit excitation light with the same power and the different wavelengths $\lambda 1$ through $\lambda n$.

[S83] The EDFA spectrum monitoring section 24a receives ASE which leaks out from the optical amplifier 22 via the coupler C4, monitors the level of ASE corresponding to each of $\lambda 1$ through $\lambda n$, and informs the ASE correction section 24b of monitoring results.

[S84] The ASE correction section 24b controls the power of excitation light with each of the wavelengths $\lambda 1$ through $\lambda n$ emitted from the excitation section 22a on the basis of the monitoring results and performs a tilt correction regarding the ASE as shown in FIG. 9. Furthermore, the ASE correction section 24b stores one level value of ASE after the tilt correction.

[S85] The optical amplifier 22 performs EDF amplification of an optical signal at optical transmission time.

[S86] The EDFA spectrum monitoring section 24a receives an optical signal obtained by EDF amplification via the coupler C4, monitors the optical level of the optical signal, and informs the ASE correction section 24b of a monitored value.

[S87] The ASE correction section 24b detects the optical level of an optical signal obtained as a result of removing an ASE noise component by subtracting the ASE level value stored in step S84 from the monitored value obtained in step S86 and informs the upper layer 25 of it. Such control enables the upper layer 25 to recognize the optical level of an optical signal obtained by performing EDF amplification of an optical signal and removing an ASE noise component.

As described above, the following process will be performed in the optical transmission apparatus according to the present invention (shown in FIGS. 1, 5, and 8). In an operating environment, excitation light is emitted and the level of optical noise emitted or scattered by the optical amplifier is monitored. At optical transmission time, the level of optical noise is subtracted and the optical level of an amplified signal is detected. As a result, an error will not occur in an optical noise correction and an optical level can be detected with great precision.

The above optical transmission apparatus include the Raman amplifier and the EDFA, so they have both the function on the Raman amplification side of detecting an optical level and the function on the EDFA side of detecting an optical level. However, if they include either of the Raman amplifier and the EDFA, then they should have the corresponding function of detecting an optical level.

Other embodiments in which optical level detection is controlled will now be described. With the above optical transmission apparatus (shown in FIGS. 1, 5, and 8), an optical level is detected by measuring the level of optical noise and by subtracting a measured value from an amplified signal at optical transmission time. With the following optical transmission apparatus, however, the level of an optical signal (main signal) will be detected with great precision by the use of an optical spectrum analyzer.

Figure 12:
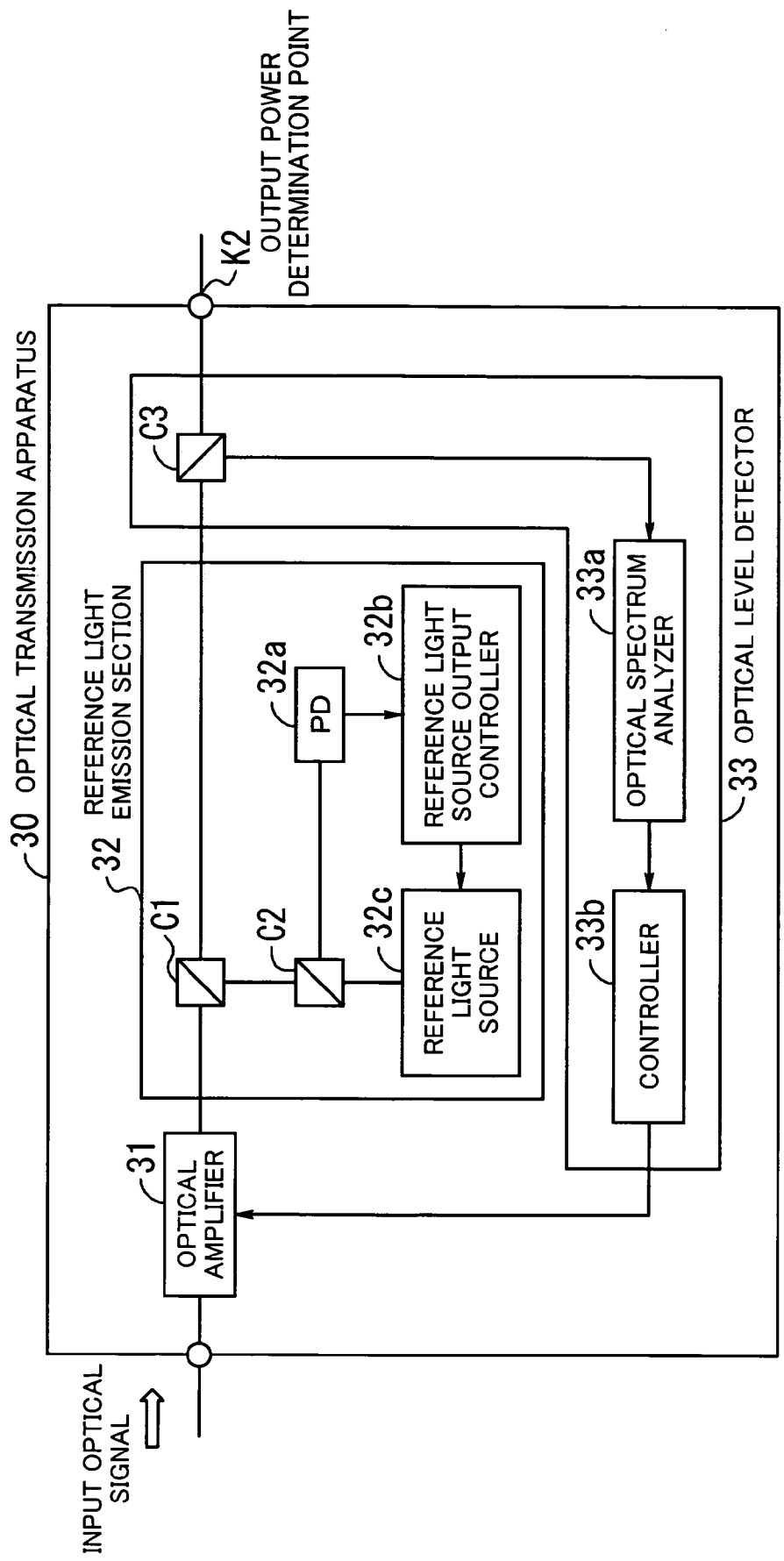
FIG. 12 shows the structure of an optical transmission apparatus.

FIG. 12 shows the structure of an optical transmission apparatus. An optical transmission apparatus 30 comprises an optical amplifier 31, a reference light emission section 32, and an optical level detector 33. The reference light emission section 32 includes a photo diode (PD) 32a, a reference light source output controller 32b, a reference light source 32c, and couplers C1 and C2. The optical level detector 33 includes an optical spectrum analyzer 33a, a controller 33b, and a coupler C3.

The optical amplifier 31 receives and amplifies an input optical signal (for example, an EDFA is used as the optical amplifier 31). Before optical transmission, the reference light emission section 32 emits reference light and sets a reference level value at an output power determination point K2 behind the optical amplifier 31.

To be concrete, a level value (for example, 0 dBm) obtained at the output power determination point K2 when only reference light is inputted is determined. The reference light source 32c is adjusted at the time of the optical transmission apparatus 30 being assembled so that this predetermined level value will be obtained. However, the reference light travels through the couplers C1 through C3 to the output power determination point K2, so losses in the couplers C1 through C3, a fiber loss, and the like will occur. Therefore, the reference light source 32c should be set with these losses taken into consideration so that the level value 0 dBm will be obtained at the output power determination point K2 by reference light emitted thereby.

The reference light (it is assumed that the level value 0 dBm is obtained at the output power determination point K2 by reference light with power P0) emitted from the reference light source 32c travels through the coupler C2 to the PD 32a, is converted to an electrical signal, and is received by the reference light source output controller 32b. The reference light source output controller 32b controls the reference light source 32c so that it will always output reference light with the power P0.

A laser diode (LD), a light-emitting diode (LED), or the like is used as the reference light source 32c. The power of the reference light may be maintained at an initial value or may be changed from the outside. To eliminate wavelength dependence, a plurality of reference light sources 32c or the reference light source 32c of a variable wavelength type may be used.

The optical spectrum analyzer 33a in the optical level detector 33 measures an optical level obtained at the output power determination point K2 when only the reference light is inputted before optical transmission, and finds out the differential between the reference level value (0 dBm) and a measured value. At optical transmission time the optical spectrum analyzer 33a measures the level of an optical signal amplified by the optical amplifier 31 according to the transmission wavelengths of a main signal. The controller 33b detects an optical level by correcting a result obtained by measuring the level of each amplified signal by the use of the differential value. Furthermore, the controller 33b exerts ALC over the optical amplifier 31 on the basis of the results of detection. The controller 33b can be controlled by instructions from the outside by connecting it to a terminal unit, such as a personal computer.

Figure 13:
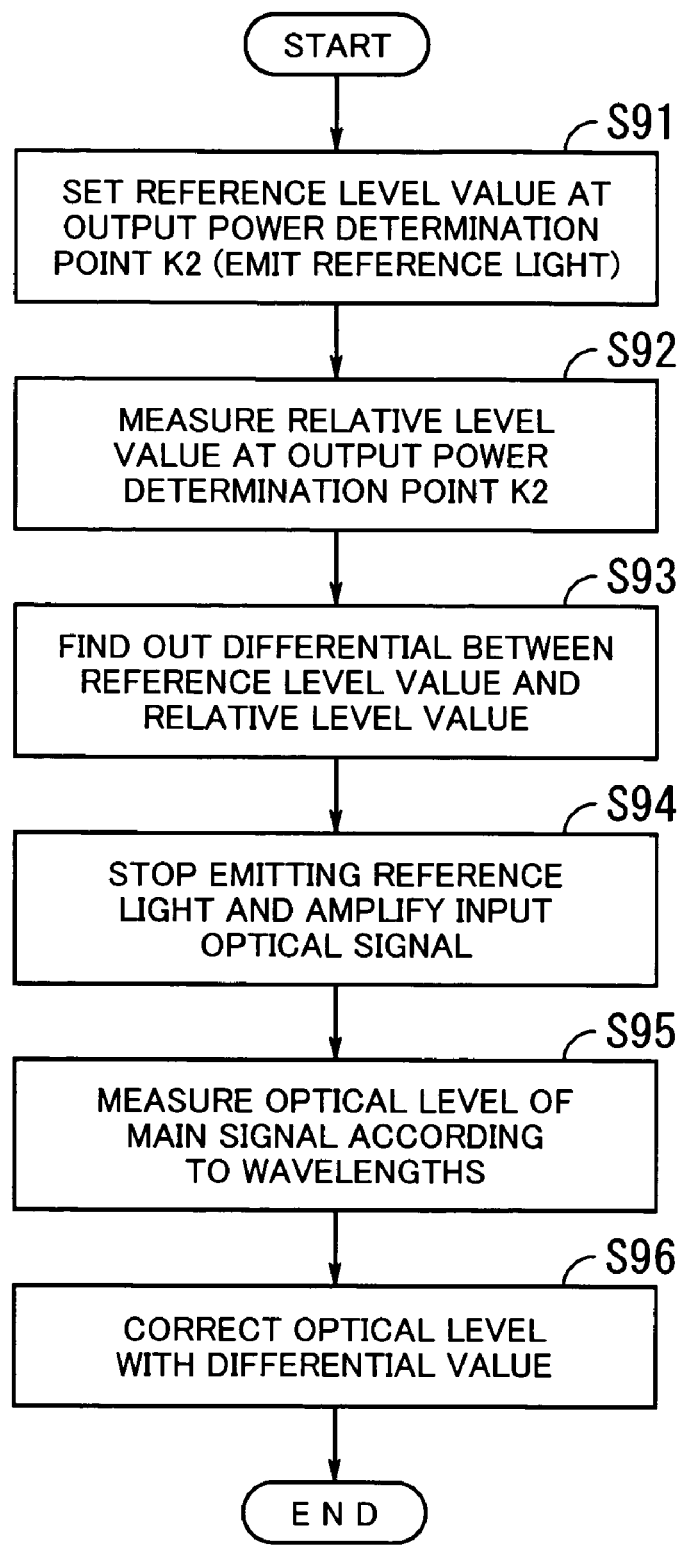
FIG. 13 is a flow chart showing the operation of the optical transmission apparatus.

Operation will now be described. FIG. 13 is a flow chart showing the operation of the optical transmission apparatus 30. Steps S91 through S93 are performed for measurement in an operating environment before optical transmission. Steps S94 through S96 are performed during optical transmission.

[S91] In the optical transmission apparatus 30 located in an operating environment, before optical transmission the reference light emission section 32 emits reference light by which a predetermined reference level value (0 dBm) will be obtained at the output power determination point K2.

[S92] The optical spectrum analyzer 33a receives the reference light which travels through the coupler C3, and measures the level value of this reference light as a level value at the output power determination point K2. In this example, a fiber is connected to the coupler C3 to measure a level value at the output power determination point K2 with the optical spectrum analyzer 33a, so a measured value will be relative due to, for example, losses in the coupler C3 and the connected fiber. The optical spectrum analyzer 33a measures a relative level value (−3 dBm, for example) and informs the controller 33b of it. (In short, a level value at the output power determination point K2 is 0 dBm, but a level value obtained by measuring with the optical spectrum analyzer 33a is not 0 dBm but −3 dBm due to, for example, a fiber loss.)

[S93] The controller 33b finds out the differential between the reference level value (0 dBm) and the relative level value (−3 dBm). (A differential value is +3 dB.)

[S94] The reference light emission section 32 stops emitting the reference light at optical transmission time. In addition, the optical amplifier 31 amplifies an input optical signal.

[S95] The optical spectrum analyzer 33a receives the optical signal amplified via the coupler C3, measures the optical level of a main signal according to transmission wavelengths, and informs the controller 33b of a measured value.

[S96] The controller 33b corrects the measured value obtained in step S95 with the differential value. For example, if the measured value obtained in step S95 is −2 dBm, then an actual optical level (absolute level value) detected will be given as +1 dBm by taking the differential value +3 dB into consideration. Furthermore, the controller 33b exerts ALC over the optical amplifier 31 on the basis of the detected value of the optical level after amplification. (For example, to set a level value at the output power determination point K2 at optical transmission time to 0 dBm, the controller 33b should exert ALC over the optical amplifier 31 and reduce the current level by 1 dB.)

As stated above, with the optical transmission apparatus 30 according to the present invention, the level of an optical signal amplified by the optical amplifier 31 is measured by the optical spectrum analyzer 33a. As a result, an optical level can be measured according to the wavelengths of a main signal. Therefore, even if a main signal is mixed with optical noise, the optical level of the main signal can be detected with great precision according to transmission wavelengths.

Moreover, in the present invention, the reference light emission section 32 is included, a reference level value at the output power determination point K2 is set, and a correction value used in the case of measuring a level value at the output power determination point K2 by the use of the optical spectrum analyzer 33a is found out in advance. This enables the optical spectrum analyzer 33a to measure the absolute level value of an amplified signal at the output power determination point K2 on the basis of the correction value. Therefore, the precision of measurement by the optical spectrum analyzer 33a can be improved.

Figure 14:
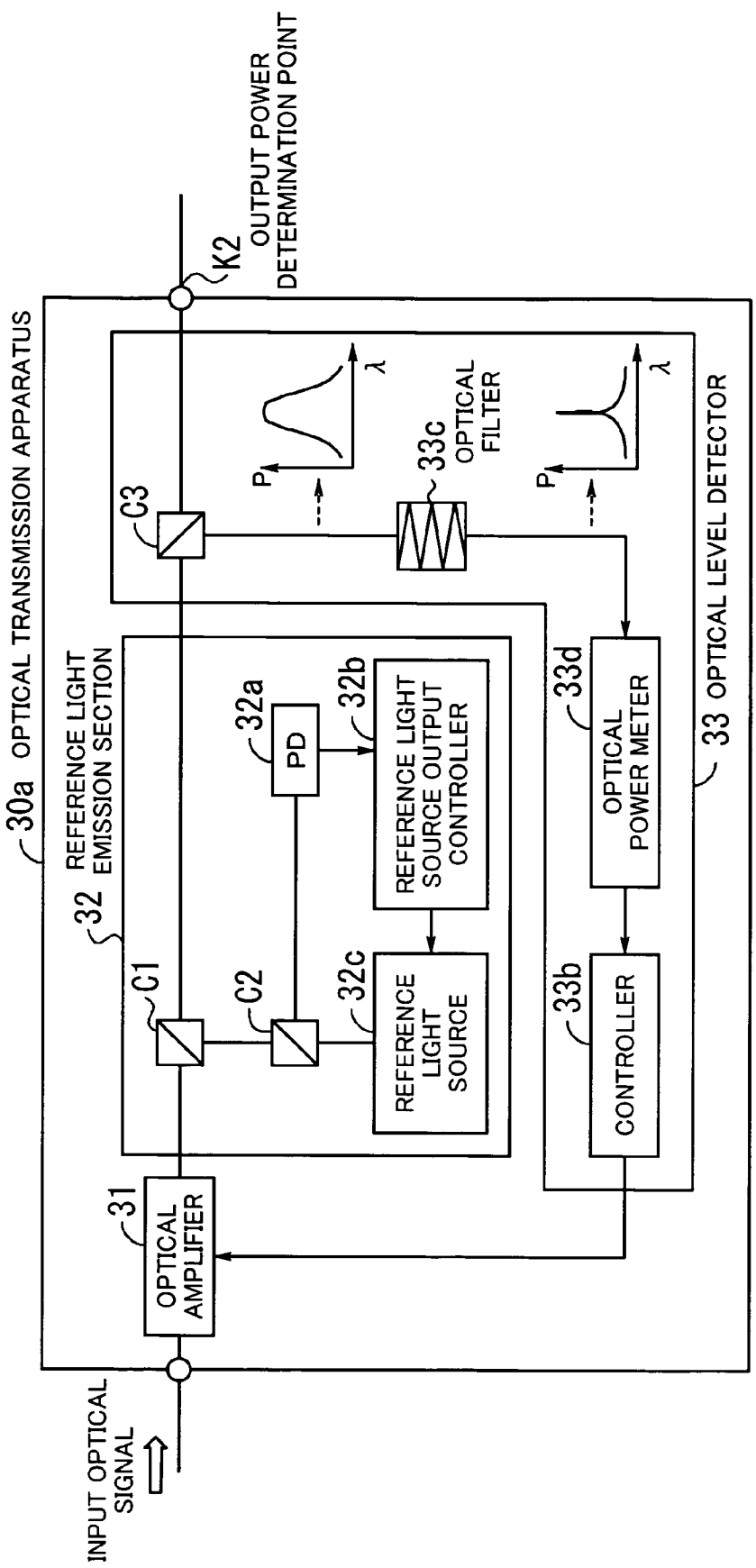
FIG. 14 shows a modification of the optical transmission apparatus.

FIG. 14 shows a modification of the optical transmission apparatus 30. An optical transmission apparatus 30a differs from the optical transmission apparatus 30 shown in FIG. 12 in that it includes an optical filter 33c and an optical power meter 33d in place of the optical spectrum analyzer 33a. The other components in the optical transmission apparatus 30a are the same as those in the optical transmission apparatus 30.

The optical filter 33c (a narrow-band optical filter, a variable wavelength filter, or the like is used as the optical filter 33c) performs the filtering of an optical signal it received via a coupler C3 to extract a required wavelength. The optical power meter 33d measures the optical level of a signal with a required wavelength. By doing so, the function of an optical spectrum analyzer can be realized (the rest of operation is the same as that of the optical transmission apparatus 30, so descriptions of it will be omitted).

Figure 15:
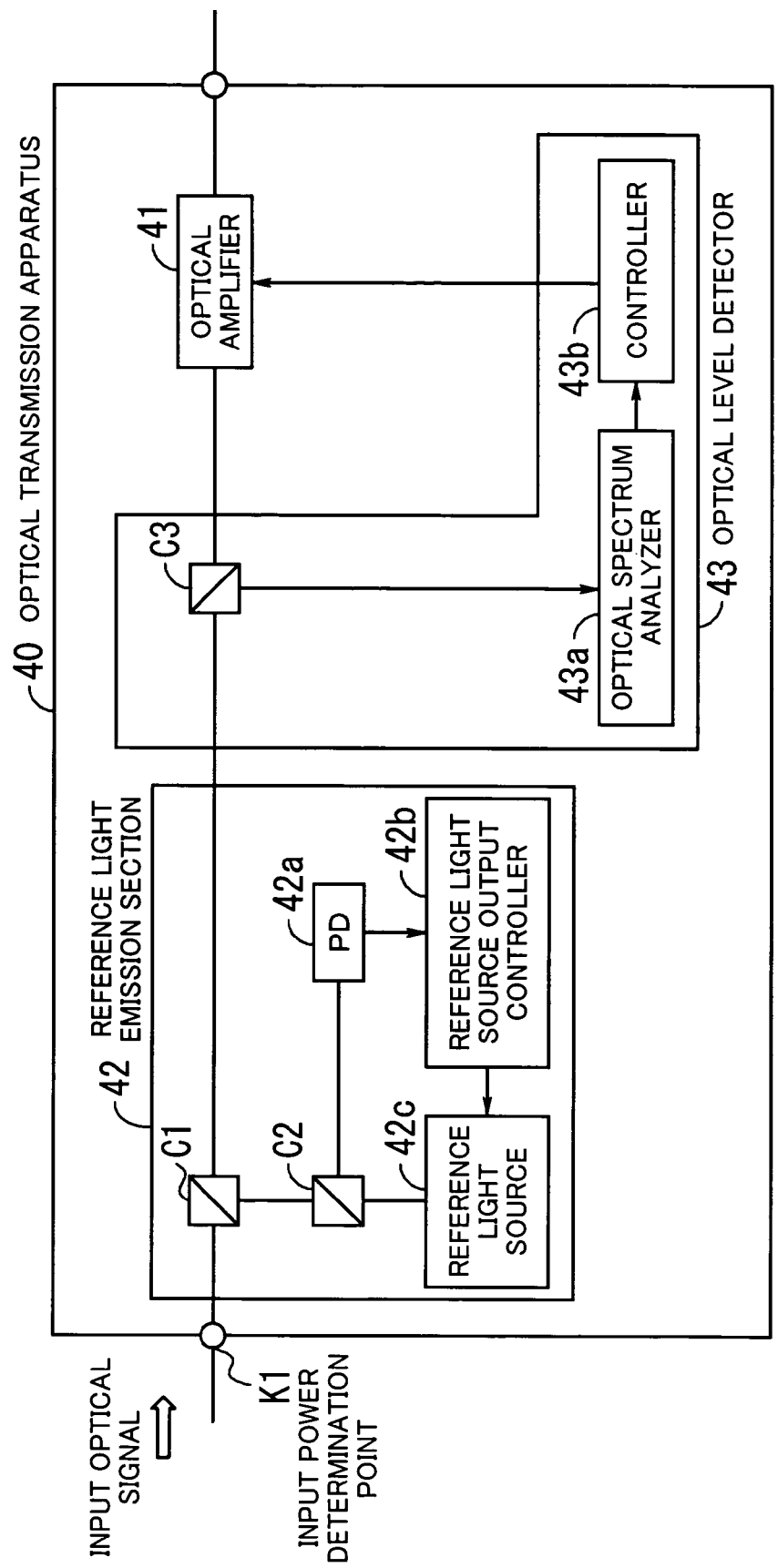
FIG. 15 shows the structure of an optical transmission apparatus.

An optical transmission apparatus in which a reference light emission section is located on the input side will now be described. FIG. 15 shows the structure of an optical transmission apparatus. An optical transmission apparatus 40 comprises an optical amplifier 41, a reference light emission section 42, and an optical level detector 43. The reference light emission section 42 includes a PD 42a, a reference light source output controller 42b, a reference light source 42c, and couplers C1 and C2. The optical level detector 43 includes an optical spectrum analyzer 43a, a controller 43b, and a coupler C3.

Figure 16:
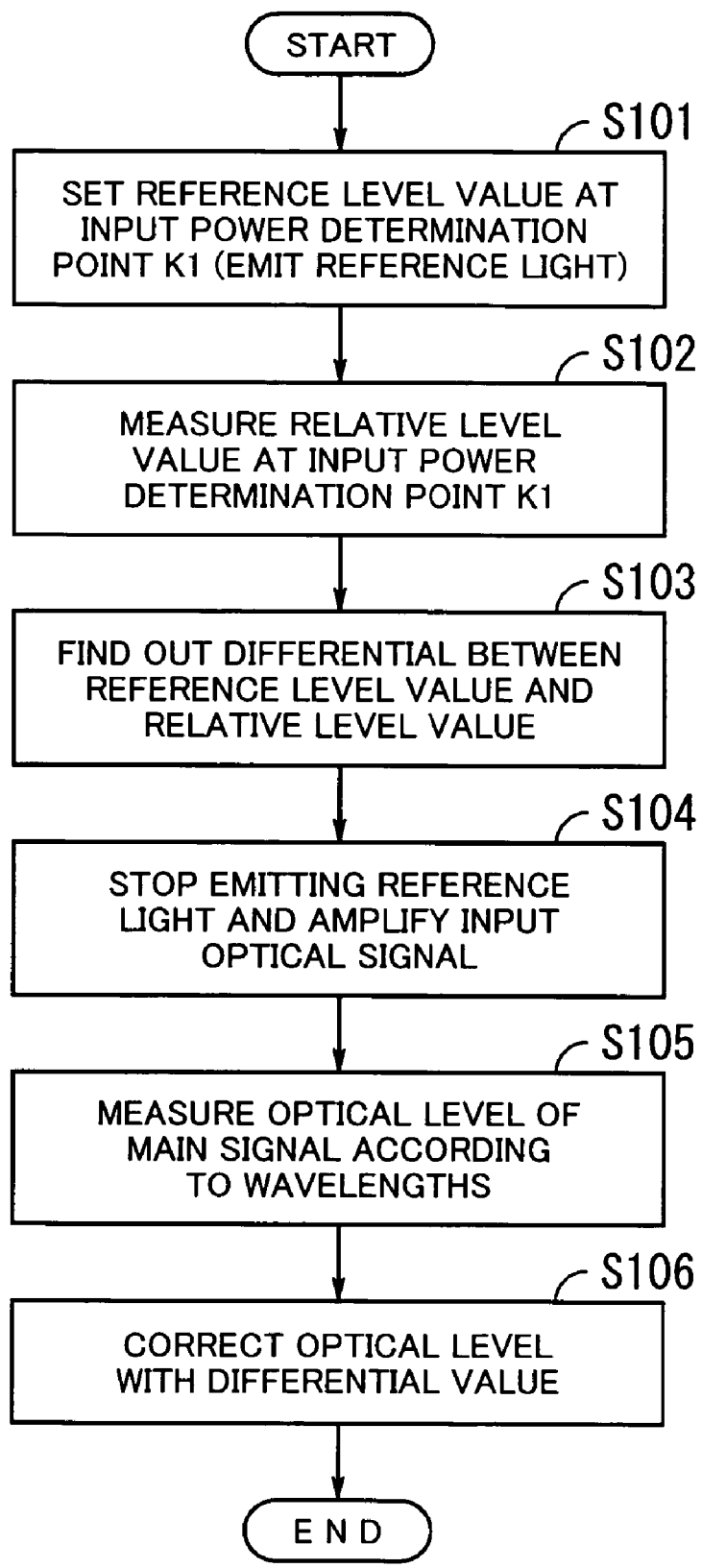
FIG. 16 is a flow chart showing the operation of the optical transmission apparatus.

FIG. 16 is a flow chart showing the operation of the optical transmission apparatus 40. Steps S101 through S103 are performed for measurement in an operating environment before optical transmission. Steps S104 through S106 are performed during optical transmission.

[S101] In the optical transmission apparatus 40 located in an operating environment, before optical transmission the reference light emission section 42 emits reference light by which a predetermined reference level value (0 dBm) will be obtained at an input power determination point K1.

[S102] The optical spectrum analyzer 43a receives the reference light which travels through the coupler C3, and measures the level value of this reference light as a level value at the input power determination point K1. As is the same with FIG. 13, a relative level value (−3 dBm, for example) will be obtained. The optical spectrum analyzer 43a informs the controller 43b of the relative level value it measured.

[S103] The controller 43b finds out the differential between the reference level value (0 dBm) and the relative level value (−3 dBm). (A differential value is +3 dB.)

[S104] The reference light emission section 42 stops emitting the reference light at optical transmission time. In addition, the optical amplifier 41 amplifies an input optical signal.

[S105] The optical spectrum analyzer 43a receives the input optical signal via the coupler C3, measures the optical level of a main signal according to transmission wavelengths, and informs the controller 43b of a measured value.

[S106] The controller 43b corrects the measured value obtained in step S105 with the differential value. For example, if the measured value obtained in step S105 is −2 dBm, then the absolute level value of the input optical signal at the time of being received will be given as +1 dBm. Furthermore, the controller 43b exerts ALC over the optical amplifier 41 on the basis of the detected optical level value of the input optical signal.

As stated above, with the optical transmission apparatus 40 according to the present invention, the level of an optical signal at the input power determination point K1 is measured by the optical spectrum analyzer 43a. As a result, an optical level can be measured according to the wavelengths of a main signal. Therefore, even if a main signal is mixed with optical noise, the optical level of the main signal can be detected with great precision according to transmission wavelengths.

Moreover, the reference light emission section 42 is included, a reference level value at the input power determination point K1 is set, and a correction value used in the case of measuring a level value at the input power determination point K1 by the use of the optical spectrum analyzer 43a is found out in advance. As a result, the absolute level value of an input main signal can be measured and the precision of measurement by the optical spectrum analyzer 43a can be improved.

Figure 17:
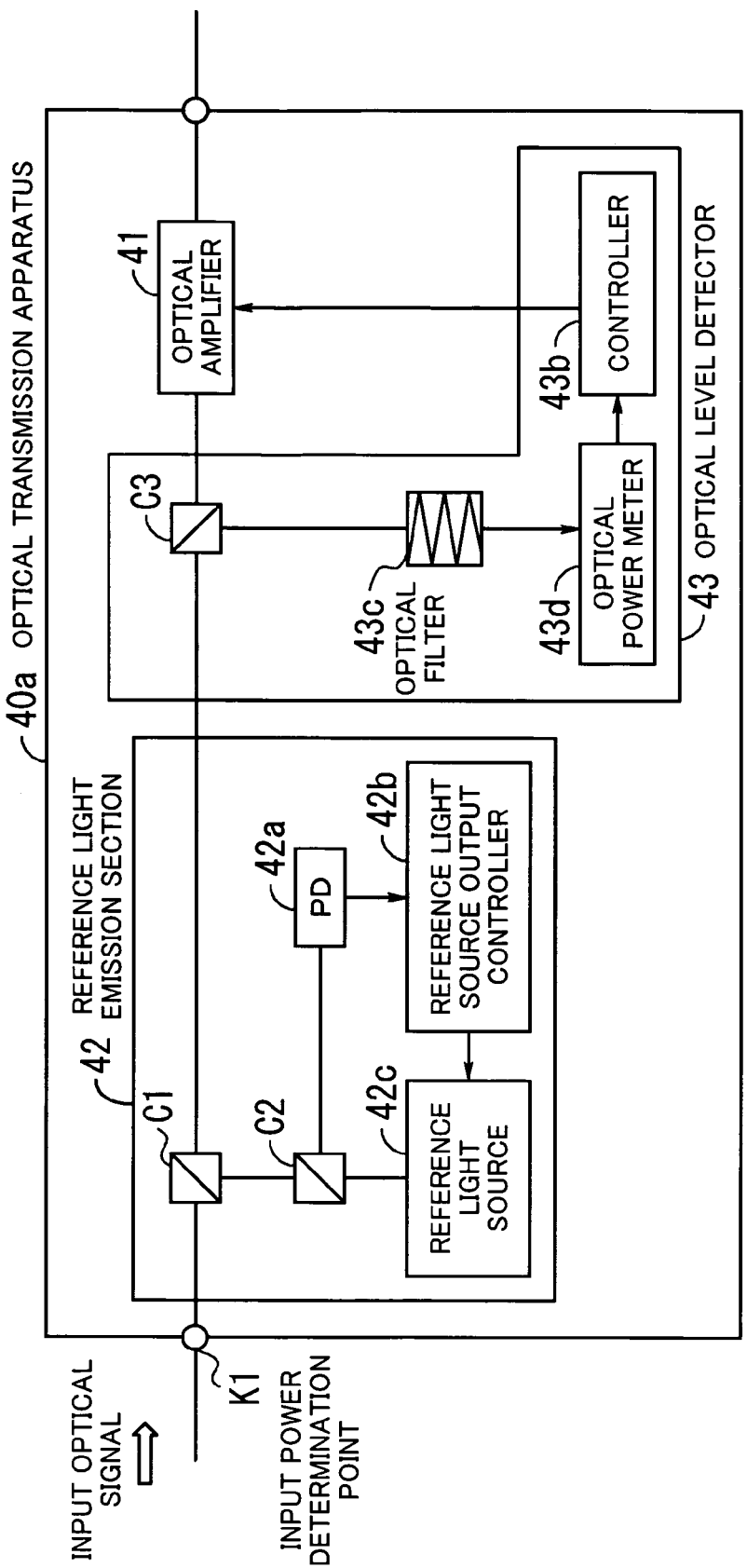
FIG. 17 shows a modification of the optical transmission apparatus.

FIG. 17 shows a modification of the optical transmission apparatus 40. An optical transmission apparatus 40a differs from the optical transmission apparatus 40 shown in FIG. 15 in that it includes an optical filter 43c and an optical power meter 43d in place of the optical spectrum analyzer 43a. The other components in the optical transmission apparatus 40a are the same as those in the optical transmission apparatus 40 and operation was described in FIG. 14. Accordingly, descriptions of the optical transmission apparatus 40a will be omitted.

Figure 18:
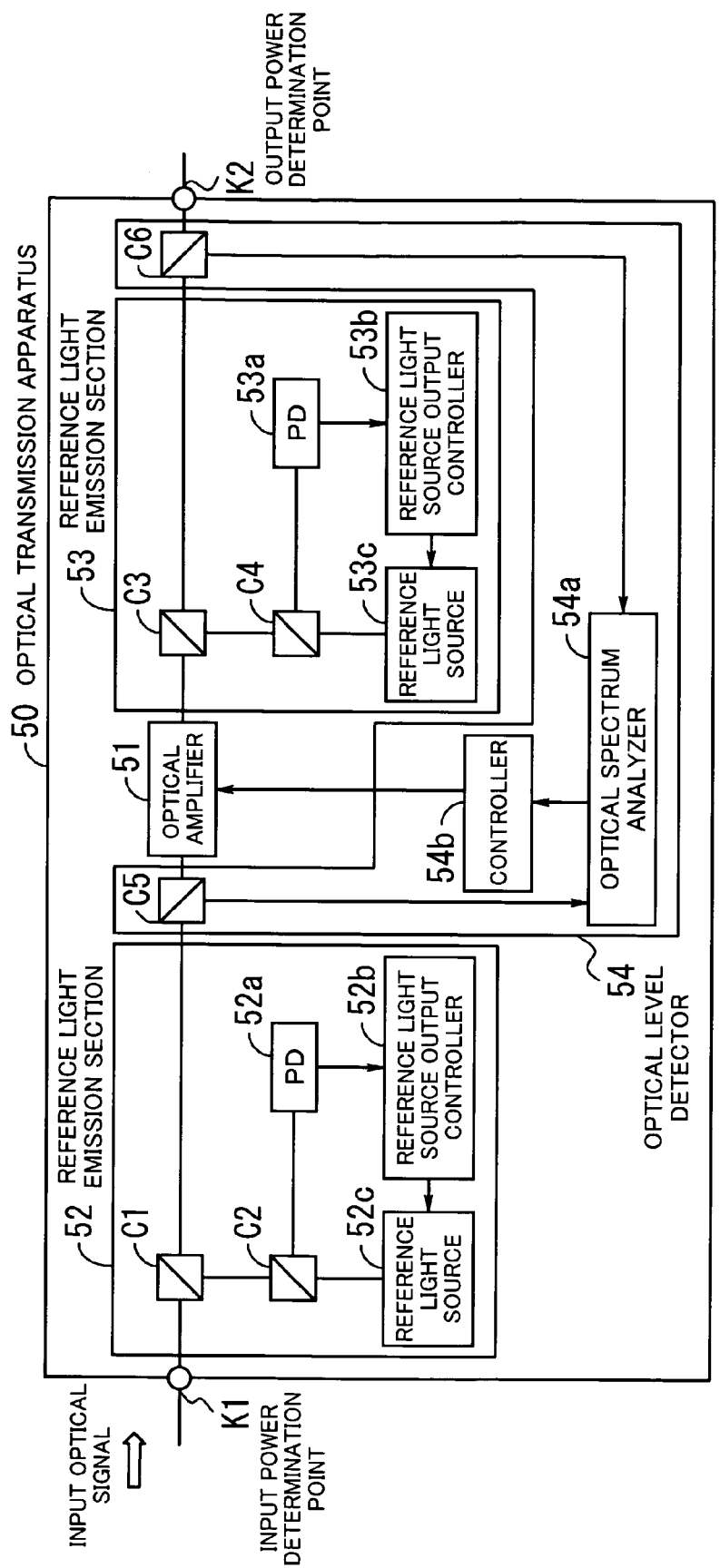
FIG. 18 shows the structure of an optical transmission apparatus.

An optical transmission apparatus in which reference light emission sections are located on the input and output sides, respectively, will now be described. FIG. 18 shows the structure of an optical transmission apparatus. An optical transmission apparatus 50 comprises an optical amplifier 51, reference light emission sections 52 and 53, and an optical level detector 54.

The reference light emission section (input-side reference light emission section) 52 includes a PD 52a, a reference light source output controller 52b, a reference light source 52c, and couplers C1 and C2. The reference light emission section (output-side reference light emission section) 53 includes a PD 53a, a reference light source output controller 53b, a reference light source 53c, and couplers C3 and C4. The optical level detector 54 includes an optical spectrum analyzer 54a, a controller 54b, and couplers C5 and C6.

To detect the optical level of an input main signal, the following process will be performed. Before optical transmission, the optical level detector 54 measures power at an input power determination point K1 and finds out the differential between a reference level value and a measured value. At optical transmission time, the optical level detector 54 measures the level of an input optical signal according to the transmission wavelengths of a main signal, corrects a measurement result with the differential value, and detects an optical level.

To detect the optical level of an optical signal amplified by the optical amplifier 51, the following process will be performed. Before optical transmission, the optical level detector 54 measures power at an output power determination point K2 and finds out the differential between a reference level value and a measured value. At optical transmission time, the optical level detector 54 measures the level of an amplified signal according to the transmission wavelengths of a main signal, corrects a measurement result with the differential value, and detects an optical level. In this case, two optical filters (one is located for the input side and the other is located for the output side) and an optical power meter may be used in place of the optical spectrum analyzer 54a.

Figure 19:
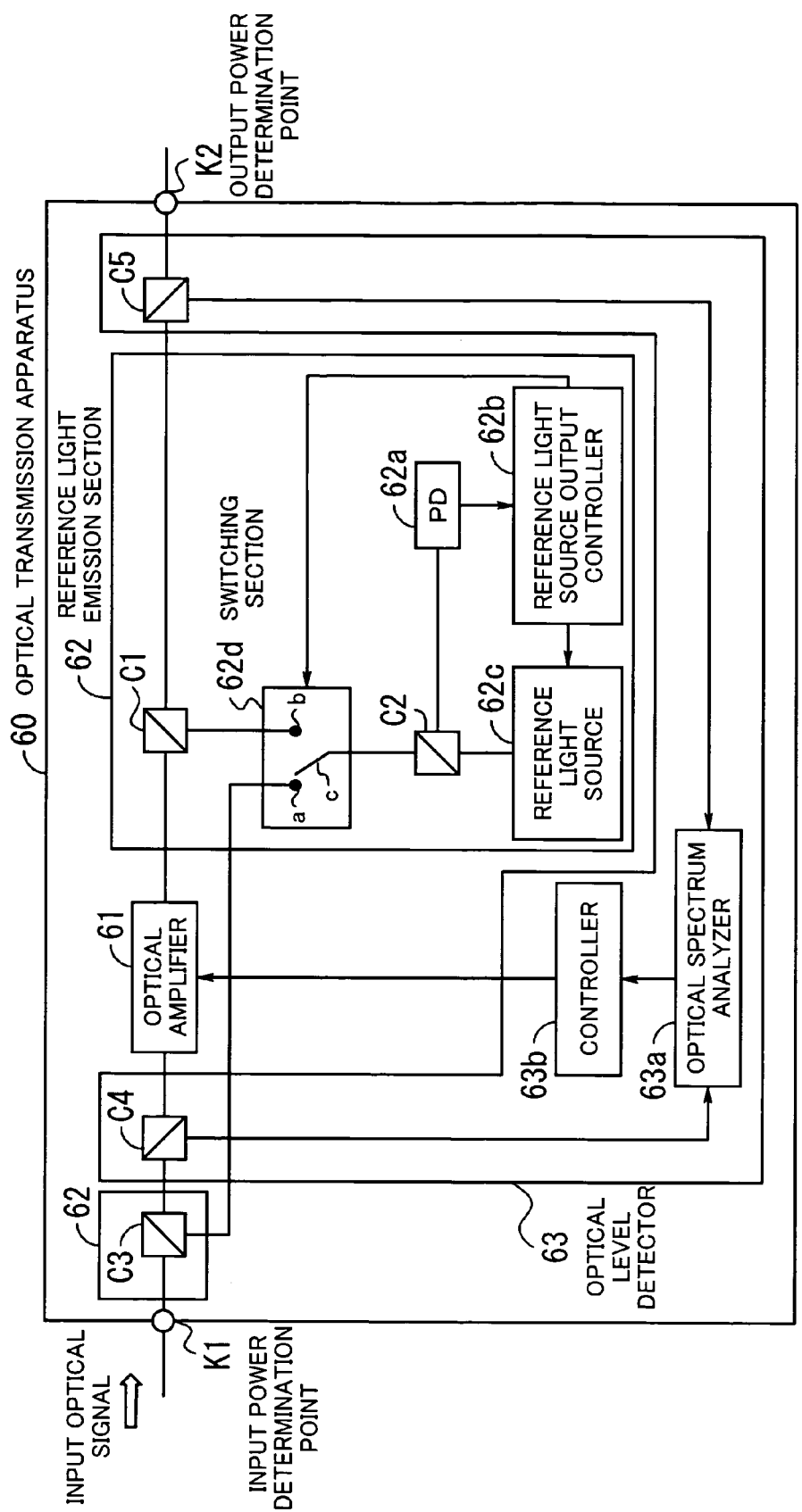
FIG. 19 shows the structure of an optical transmission apparatus.

An optical transmission apparatus including a switching function for switching optical level detection from the input side to the output side or from the output side to the input side will now be described. FIG. 19 shows the structure of an optical transmission apparatus. An optical transmission apparatus 60 comprises an optical amplifier 61, a reference light emission section 62, and an optical level detector 63.

The reference light emission section 62 includes a PD 62a, a reference light source output controller 62b, a reference light source 62c, a switching section 62d, and couplers C1, C2, and C3. The optical level detector 63 includes an optical spectrum analyzer 63a, a controller 63b, and couplers C4 and C5.

The switching section 62d is newly located in the reference light emission section 62 in the optical transmission apparatus 60 for switching optical level detection from the input side to the output side or from the output side to the input side. The switching section 62d determines on the basis of control information from the reference light source output controller 62b whether the optical level detector 63 should detect the level of an optical signal on the input side or on the output side.

To detect the level of an input optical signal, the following process will be performed. A terminal c is connected to a terminal a in the switching section 62d and reference light is emitted from the reference light emission section 62 to the coupler C3. The optical level detector 63 detects the level of an optical signal it receives via the coupler C4. On the other hand, to detect the level of an amplified signal, the following process will be performed. The terminal c is connected to a terminal b in the switching section 62d and reference light is emitted from the reference light emission section 62 to the coupler C1. The optical level detector 63 detects the level of an optical signal it receives via the coupler C5. In this case, two optical filters (one is located for the input side and the other is located for the output side) and an optical power meter may be used in place of the optical spectrum analyzer 63a.

As described above, in the present invention an optical level can be detected with great precision regardless of customers' use environments (temperature, fiber types, WDM characteristics, lamp losses, variation among optical amplifiers as parts). In addition, the precision of monitoring and control by an optical transmission system is improved, so highly reliable optical transmission can be performed.

Furthermore, even if the number of wavelengths is small, an optical level can be detected with great precision. Therefore, the limitation of the minimum operating wavelength number is eliminated. Moreover, even if a high-power optical amplifier produces a large amount of noise, an optical level can be detected with great precision. Accordingly, by raising system gain, long-distance transmission can be realized.

As has been described in the foregoing, with the optical transmission apparatus according to the present invention, excitation light is emitted in an operating environment before transmission of an optical signal and the level of optical noise emitted or scattered by the optical amplifier is monitored. At the time of an optical signal being transmitted, an optical level is detected by subtracting the level of optical noise from a signal amplified by the optical amplifier. As a result, an optical noise correction and optical level detection can be performed with great precision. This leads to an improvement in optical transmission quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical apparatus connected to a transmission line, comprising:
   a Raman optical amplifier connected to the transmission line, having an excitation light source outputting an excitation light, a coupler coupling the excitation light to the transmission line, and performing Raman amplification in the transmission line; and
   an optical level detector having a monitoring section monitoring the output light of the Raman amplifier and an ASS correction section;
   wherein the ASS correction section stores as ASS level of input light from the monitoring section when optical signals are not transmitted in the transmission line,
   and wherein the Raman amplifier is controlled by the output power of the Raman amplifier and the ASS level.

* * * * *

UNITED STATES PATENT AND TRADEMARK OFFICE
CERTIFICATE OF CORRECTION

PATENT NO. : 7,139,117 B2  Page 1 of 1
APPLICATION NO. : 10/793099
DATED : November 21, 2006
INVENTOR(S) : Eisuke Nakamura et al.

It is certified that error appears in the above-identified patent and that said Letters Patent is hereby corrected as shown below:

Column 16, line 57, change "stores as" to --stores an--.

Signed and Sealed this

Fifteenth Day of April, 2008

JON W. DUDAS
*Director of the United States Patent and Trademark Office*